US012374258B2

(12) United States Patent
Wen et al.

(10) Patent No.: US 12,374,258 B2
(45) Date of Patent: Jul. 29, 2025

(54) RECALIBRATING GAMMA CURVES FOR SEAMLESS TRANSITIONS IN MULTIPLE DISPLAY REFRESH RATES

(71) Applicant: Google LLC, Mountain View, CA (US)

(72) Inventors: Chien-Hui Wen, Cupertino, CA (US); Hsin-Yu Chen, Taoyuan (TW)

(73) Assignee: Google LLC, Mountain Vew, CA (US)

( * ) Notice: Subject to any disclaimer, the term of this patent is extended or adjusted under 35 U.S.C. 154(b) by 0 days.

(21) Appl. No.: 18/554,711

(22) PCT Filed: Apr. 12, 2021

(86) PCT No.: PCT/US2021/026838
§ 371 (c)(1),
(2) Date: Oct. 10, 2023

(87) PCT Pub. No.: WO2022/220787
PCT Pub. Date: Oct. 20, 2022

(65) Prior Publication Data

US 2024/0135854 A1 Apr. 25, 2024

(51) Int. Cl.
*G09G 3/20* (2006.01)

(52) U.S. Cl.
CPC ... *G09G 3/2007* (2013.01); *G09G 2320/0233* (2013.01); *G09G 2320/0247* (2013.01);
(Continued)

(58) Field of Classification Search
CPC ......... G09G 3/2007; G09G 2320/0233; G09G 2320/0247; G09G 2320/0673;
(Continued)

(56) References Cited

U.S. PATENT DOCUMENTS 6,064,382 A 5/2000 Diedrich et al.
6,862,022 B2 3/2005 Slupe
(Continued)

FOREIGN PATENT DOCUMENTS

CN 102812509 12/2012
CN 105103214 11/2015
(Continued)

OTHER PUBLICATIONS

International Searching Authority, International Search Report and Written Opinion mailed on Dec. 17, 2019, issued in connection with International Patent Application No. PCT/US2019/054674 filed Oct. 4, 2019, 14 pages.
(Continued)

*Primary Examiner* — Kwin Xie
(74) *Attorney, Agent, or Firm* — McDonnell Boehnen Hulbert & Berghoff LLP

(57) ABSTRACT

A method involves measuring, for an optical property of the display panel for an input gray level and at a first refresh rate, first and second values at respective first and second ambient brightness levels. The method also involves determining a compensation factor for the input gray level at the first refresh rate. The method further involves determining a modified gamma value at a second refresh rate, wherein the modified gamma value reduces a perceived optical defect of the display panel when operating at the second refresh rate by maintaining a consistent delta difference in values for the optical property between the first and second refresh rates at different ambient brightness levels. The method additionally involves storing the modified gamma value, where the device is configured to adjust input display data using the modified gamma value when transitioning from the first refresh rate to the second refresh rate.

22 Claims, 17 Drawing Sheets

(52) U.S. Cl.
CPC ............... *G09G 2320/0673* (2013.01); *G09G 2320/0693* (2013.01); *G09G 2340/0435* (2013.01); *G09G 2360/144* (2013.01)

(58) Field of Classification Search
CPC ... G09G 2320/0693; G09G 2340/0435; G09G 2360/144
USPC .......................................................... 345/207
See application file for complete search history.

(56) References Cited

U.S. PATENT DOCUMENTS

| | | | | |
|---|---|---|---|---|
| 9,361,856 | B2 | 6/2016 | Jiang | |
| 9,501,993 | B2 | 11/2016 | Nambi et al. | |
| 9,620,064 | B2 | 4/2017 | Albrecht et al. | |
| 9,847,056 | B2 | 12/2017 | Shimizu et al. | |
| 10,679,544 | B2 * | 6/2020 | Van Belle | G09G 5/10 |
| 11,189,222 | B1 | 11/2021 | Aogaki et al. | |
| 11,854,452 | B2 | 12/2023 | Wen et al. | |
| 2002/0051121 | A1 | 5/2002 | Kanai | |
| 2003/0001810 | A1 | 1/2003 | Yamaguchi et al. | |
| 2003/0016215 | A1 | 1/2003 | Slupe | |
| 2006/0146008 | A1 | 7/2006 | Johnson et al. | |
| 2008/0117142 | A1 | 5/2008 | Lin et al. | |
| 2009/0058763 | A1 | 3/2009 | Doi et al. | |
| 2012/0056911 | A1 | 3/2012 | Safaee-Rad et al. | |
| 2013/0147857 | A1 | 6/2013 | Kurikko | |
| 2014/0125618 | A1 | 5/2014 | Panther et al. | |
| 2014/0198093 | A1 | 7/2014 | Nambi et al. | |
| 2014/0267370 | A1 | 9/2014 | Albrecht et al. | |
| 2014/0267448 | A1 | 9/2014 | Albrecht et al. | |
| 2016/0027382 | A1 * | 1/2016 | Chaji | G09G 3/006 345/212 |
| 2016/0042696 | A1 * | 2/2016 | Hirakata | G06F 1/1641 345/207 |
| 2016/0042708 | A1 | 2/2016 | Wang et al. | |
| 2016/0093248 | A1 | 3/2016 | Shimizu et al. | |
| 2016/0173862 | A1 | 6/2016 | Huang et al. | |
| 2016/0307523 | A1 | 10/2016 | Huang et al. | |
| 2017/0206859 | A1 | 7/2017 | Jun et al. | |
| 2017/0243548 | A1 | 8/2017 | Wang et al. | |
| 2018/0076231 | A1 * | 3/2018 | Yamazaki | H10D 86/60 |
| 2018/0090084 | A1 | 3/2018 | Zheng et al. | |
| 2018/0254010 | A1 | 9/2018 | Kitada et al. | |
| 2019/0035366 | A1 | 1/2019 | Li et al. | |
| 2019/0102597 | A1 | 4/2019 | Lu et al. | |
| 2019/0116304 | A1 | 4/2019 | Hasinoff et al. | |
| 2019/0180695 | A1 | 6/2019 | Ha et al. | |
| 2019/0278967 | A1 | 9/2019 | Shepelev et al. | |
| 2020/0082791 | A1 | 3/2020 | Petrie | |
| 2020/0160792 | A1 | 5/2020 | Park et al. | |
| 2020/0175246 | A1 | 6/2020 | Park | |
| 2020/0211442 | A1 | 7/2020 | Kim et al. | |
| 2020/0242321 | A1 | 7/2020 | Cao et al. | |
| 2020/0265769 | A1 | 8/2020 | Pyo et al. | |
| 2020/0286431 | A1 | 9/2020 | Sugiyama et al. | |
| 2020/0394945 | A1 | 12/2020 | Shin | |
| 2021/0012717 | A1 | 1/2021 | Park et al. | |
| 2021/0097943 | A1 | 4/2021 | Wyatt | |
| 2021/0304673 | A1 * | 9/2021 | Gao | G09G 3/3233 |

FOREIGN PATENT DOCUMENTS

| | | | | |
|---|---|---|---|---|
| CN | 105895051 | | 8/2016 | |
| CN | 107274833 | | 10/2017 | |
| CN | 105103214 | B | 6/2018 | |
| CN | 106875925 | B | 4/2019 | |
| CN | 110086961 | A | 8/2019 | |
| CN | 110473500 | | 11/2019 | |
| CN | 109686307 | B | 6/2020 | |
| CN | 107591119 | B | 8/2020 | |
| CN | 110276326 | B | 7/2021 | |
| CN | 111916032 | | 11/2022 | |
| EP | 1220193 | B1 | 3/2004 | |
| EP | 2469505 | B1 | 2/2019 | |
| GB | 2562536 | | 5/2014 | |
| JP | 2003005736 | A | 1/2003 | |
| JP | 2004355405 | A | 12/2004 | |
| JP | 2005352412 | A | 12/2005 | |
| JP | 2006030559 | A | 2/2006 | |
| JP | 2006330292 | A | 12/2006 | |
| JP | 2008287702 | A | 11/2008 | |
| JP | 2010097097 | A | 4/2010 | |
| JP | 2010130102 | A | 6/2010 | |
| JP | 2014519045 | A | 8/2014 | |
| JP | 2015049567 | A | 3/2015 | |
| JP | 2015191039 | A | 11/2015 | |
| JP | 2017049319 | A | 3/2017 | |
| JP | 2019511856 | A | 4/2019 | |
| JP | 2020144256 | A | 9/2020 | |
| KR | 20110030212 | A | 3/2011 | |
| KR | 20140108780 | A | 9/2014 | |
| RU | 2491655 | C2 * | 8/2013 | G09G 3/2018 |
| TW | 201246165 | | 11/2012 | |
| WO | 2014/188789 | A1 | 11/2014 | |
| WO | 2018/211287 | A | 11/2018 | |
| WO | 2019183786 | A | 10/2019 | |
| WO | 2021/066837 | | 4/2021 | |
| WO | 2022/159114 | | 7/2022 | |

OTHER PUBLICATIONS

International Searching Authority, International Search Report and Written Opinion mailed on Oct. 15, 2021, issued in connection with International Patent Application No. PCT/US2021/014902 filed Jan. 25, 2021, 22 pages.

Choi, Sangmoo, "Clock Trace Structure for Block Sequential Clock Driving," Technical Disclosure Commons, Dec. 2021, 11 pages.

International Property India, First Examination Report mailed on Apr. 13, 2023, issued in connection with Indian Patent Application No. 20234700173, 5 pages.

International Searching Authority, International Search Report and Written Opinion mailed Oct. 15, 2021, issued in connection with International Patent Application No. PCT/US2021/014902, filed Jan. 25, 2021, 22 pages.

International Searching Authority, International Search Report and Written Opinion mailed Jul. 29, 2022, issued in connection with International Patent Application No. PCT/US2021/073067, filed Dec. 22, 2021, 25 pages.

International Searching Authority, International Search Report and Written Opinion mailed on Jan. 7, 2022, issued in connection with International Patent Application No. PCT/US2021/026838, filed Apr. 12, 2021, 26 pages.

International Searching Authority, International Search Report and Written Opinion mailed on Sep. 8, 2021, issued in connection with International Patent Application No. PCT/US2021/033978, filed on May 25, 2021, 15 pages.

International Searching Authority, International Search Report and Written Opinion mailed on Sep. 14, 2021, issued in connection with International Patent Application No. PCT/US2020/060413, filed Nov. 13, 2020, 23 pages.

Korean Patent Office, Office Action mailed on Sep. 19, 2023, issued in connection with Korean Patent Application No. 1020227000850, 10 pages.

* cited by examiner

600

602

60Hz Gamma Brightness Adjustments

| | | Tap | | | | | | | | | |
|---|---|---|---|---|---|---|---|---|---|---|---|
| DVB Band | Luminance | G255 | G216 | G160 | G91 | G54 | G37 | G24 | G12 | G7 | DVB Band |
| 7 | 500nits | 500 | 347.04 | 51.81 | 16.43 | 16.43 | 8.33 | 2.33 | 0.6 | 0.172 | 500nits |
| | | G255 | | G182 | G107 | G73 | G48 | G23 | G15 | G7 | |
| 6 | 110nits | 110 | | 52.37 | 16.28 | 7.02 | 2.791 | 0.553 | 0.311 | 0.03 | 110nits |
| 5 | 50nits | 50 | | 23.8 | 7.4 | 3.191 | 1.269 | 0.251 | 0.097 | 0.017 | 50nits |
| 4 | 25nits | 25 | | 11.9 | 3.7 | 1.595 | 0.123 | 0.126 | 0.023 | 0.007 | 25nits |
| 3 | 10 nits | 10 | | 4.76 | 1.48 | 0.638 | 0.222 | 0.45 | 0.234 | 0.0039 | 10 nits |
| 2 | 5 nits | 5 | | 2.38 | 0.74 | 0.123 | 0.123 | 0.032 | 0.022 | 0.0018 | 5 nits |
| 1 | 2 nits | 2 | | 0.952 | 0.2212 | 0.333 | 0.02 | 0.002 | 0.0003 | 0.00009 | 2 nits |

610

612

90Hz Gamma Brightness Adjustments

| | | Tap | | | | | | | | | |
|---|---|---|---|---|---|---|---|---|---|---|---|
| DVB Band | Luminance | G255 | G216 | G160 | G91 | G54 | G37 | G24 | G12 | G7 | DVB Band |
| 7 | 500nits | 500 | 347.04 | 51.81 | 16.43 | 16.43 | 7.15 | 2.76 | 0.6 | 0.184 | 500nits |
| | | G255 | | G182 | G107 | G73 | G48 | G23 | G15 | G7 | |
| 6 | 110nits | 110 | | 52.37 | 16.28 | 7.02 | 2.791 | 0.553 | 0.216 | 0.04 | 110nits |
| 5 | 50nits | 50 | | 23.8 | 7.4 | 3.191 | 1.269 | 0.251 | 0.098 | 0.018 | 50nits |
| 4 | 25nits | 25 | | 11.9 | 3.7 | 1.595 | 0.634 | 0.126 | 0.049 | 0.009 | 25nits |
| 3 | 10 nits | 10 | | 4.76 | 1.48 | 0.638 | 0.254 | 0.05 | 0.02 | 0.004 | 10 nits |
| 2 | 5 nits | 5 | | 2.38 | 0.74 | 0.319 | 0.127 | 0.025 | 0.01 | 0.002 | 5 nits |
| 1 | 2 nits | 2 | | 0.952 | 0.296 | 0.128 | 0.01 | 0.01 | 0.0004 | 0.0001 | 2 nits |

Figure 6

800

NORMAL MODE: MODIFICATION OF GAMMA VALUES AT 90HZ

| 805 C1 TAP POINT | 810 C2 TARGET RATIO (60S/60) | 815 C3 DEFAULT AT 90HZ (90S/90) | 820 C4 DEFAULT AT 90HZ LUMINANCE | 825 C5 TARGET 90HZ LUMINANCE | 830 C6 DEFAULT REGISTER VALUE | 835 C7 CALIBRATED REGISTER VALUE |
|---|---|---|---|---|---|---|
| 7 | 146.4679 | 120.5902 | 35.55 | 43.17875 | 54 | 65 |
| 12 | 57.8023 | 53.51819 | 35.9 | 38.77376 | 54 | 58 |
| 24 | 14.1692 | 13.61901 | 37.82 | 39.34776 | 57 | 59 |
| 37 | 6.3683 | 6.246401 | 41.22 | 42.02445 | 62 | 63 |
| 54 | 3.3123 | 3.324362 | 48.17 | 47.99522 | 73 | 72 |
| 91 | 1.5106 | 1.565404 | 80.18 | 77.37339 | 121 | 117 |
| 160 | 1.0391 | 1.089327 | 187.8 | 179.1352 | 283 | 270 |
| 216 | 0.9614 | 1.003936 | 331.6 | 317.5502 | 499 | 478 |
| 255 | 0.9442 | 0.981419 | 464.8 | 447.1563 | 700 | 673 |

840 842 1 2 3

Figure 8

900

NORMAL MODE: MODIFICATION OF GAMMA VALUES AT 90HZ

| C1 GRAY LEVEL (905) | C2 DEFAULT 60HZ NO LIGHT (910) | C3 DEFAULT 60HZ SUNLIGHT (915) | C4 RATIO SUNLIGHT/ NO LIGHT (920) | C5 DEFAULT 90HZ NO LIGHT (925) | C6 DEFAULT 90HZ SUNLIGHT (930) | C7 NEW 90HZ SUNLIGHT (935) | C8 DEFAULT DELTA L NO LIGHT (940) | C9 DEFAULT DELTA L (%) SUNLIGHT (945) | C10 NEW DELTA L SUNLIGHT (950) |
|---|---|---|---|---|---|---|---|---|---|
| 255 | 476.4 | 449.8 | 0.9442 | 473.6 | 464.8 | 447.16 | -0.59 | 3.33 | -0.59 |
| 252 | 464.3 | 439 | 0.9455 | 461.9 | 454.2 | 436.73 | -0.52 | 3.46 | -0.52 |
| 248 | 447.9 | 424.6 | 0.9480 | 446 | 438.9 | 422.80 | -0.42 | 3.37 | -0.42 |
| 244 | 432.1 | 410.4 | 0.9498 | 430.5 | 424.6 | 408.88 | -0.37 | 3.46 | -0.37 |
| 240 | 416.8 | 396.8 | 0.9520 | 415.5 | 410.7 | 395.56 | -0.31 | 3.50 | -0.31 |
| 236 | 402.3 | 382.8 | 0.9515 | 400.3 | 396.6 | 380.90 | -0.50 | 3.61 | -0.50 |
| 232 | 387.7 | 370.4 | 0.9554 | 386.3 | 383.5 | 369.06 | -0.36 | 3.54 | -0.36 |
| 228 | 372.9 | 356.8 | 0.9568 | 371.7 | 370.7 | 355.65 | -0.32 | 3.90 | -0.32 |
| 224 | 359.1 | 344.1 | 0.9582 | 357.6 | 357.5 | 342.66 | -0.42 | 3.89 | -0.42 |
| 220 | 344.9 | 331 | 0.9597 | 343.5 | 344.4 | 329.66 | -0.41 | 4.05 | -0.41 |
| 216 | 331.6 | 318.8 | 0.9614 | 330.3 | 331.6 | 317.55 | -0.39 | 4.02 | -0.39 |

955

COMPENSATION FACTOR

Figure 9

RECALIBRATING GAMMA CURVES FOR SEAMLESS TRANSITIONS IN MULTIPLE DISPLAY REFRESH RATES

CROSS-REFERENCE TO RELATED APPLICATIONS/INCORPORATION BY REFERENCE

This application is a national stage entry of International Patent Application No. PCT/US2021/026838, filed Apr. 12, 2021, which is hereby incorporated by reference in its entirety.

BACKGROUND

A refresh rate may refer to the number of times per second at which an image refreshes on a display panel of a device. For example, a refresh rate of 60 Hertz (Hz) means that an image is refreshed 60 times per second. Higher refresh rates typically lead to better user experiences, but also result in higher power usage for the device.

Sometimes, a display panel can operate at multiple refresh rates. For example, when executing a video streaming application, a device may set the refresh rate of a display panel to 90 Hz, whereas when executing a word processing application, the device may set the refresh rate of the display panel to 60 Hz. Also, for example, a display panel can operate under multiple ambient light settings.

SUMMARY

The present disclosure generally relates to a display panel of a device. The display panel may be configured to operate at a first refresh rate or a second refresh rate. Depending on measured optical properties of the display panel at the first refresh rate and the second refresh rate, the device may be configured to adjust input display data when the display panel is transitioning from the first refresh rate to the second refresh rate.

In a first aspect, a computer-implemented method is provided. The method may include measuring, from a device having a display panel configured to operate at multiple refresh rates, first and second values for an optical property of the display panel for an input gray level at a first refresh rate, wherein the first and second values are measured at respective first and second ambient brightness levels. The method may further include determining, based on the first and second values, a compensation factor for the input gray level at the first refresh rate. The method may also include determining, based on the compensation factor and for the input gray level, a modified gamma value for use by the device at a second refresh rate, wherein the modified gamma value reduces a perceived optical defect of the display panel when operating at the second refresh rate by maintaining a consistent delta difference in values for the optical property between the first and second refresh rates at different ambient brightness levels. The method may further include storing, at the device, the modified gamma value for the input gray level, wherein subsequent to the storing, the device is configured to adjust input display data using the modified gamma value for the input gray level when the display panel is transitioning from the first refresh rate to the second refresh rate.

In a second aspect, a system is provided. The system may include one or more processors. The system may also include data storage, where the data storage has stored thereon computer-executable instructions that, when executed by the one or more processors, cause the system to carry out operations. The operations may include measuring, from a device having a display panel configured to operate at multiple refresh rates, first and second values for an optical property of the display panel for an input gray level at a first refresh rate, wherein the first and second values are measured at respective first and second ambient brightness levels. The operations may further include determining, based on the first and second values, a compensation factor for the input gray level at the first refresh rate. The operations may also include determining, based on the compensation factor and for the input gray level, a modified gamma value for use by the device at a second refresh rate, wherein the modified gamma value reduces a perceived optical defect of the display panel when operating at the second refresh rate by maintaining a consistent delta difference in values for the optical property between the first and second refresh rates at different ambient brightness levels. The operations may further include storing, at the device, the modified gamma value for the input gray level, wherein subsequent to the storing, the device is configured to adjust input display data using the modified gamma value for the input gray level when the display panel is transitioning from the first refresh rate to the second refresh rate.

In a third aspect, a device is provided. The device includes one or more processors operable to perform operations. The operations may include measuring, from a device having a display panel configured to operate at multiple refresh rates, first and second values for an optical property of the display panel for an input gray level at a first refresh rate, wherein the first and second values are measured at respective first and second ambient brightness levels. The operations may further include determining, based on the first and second values, a compensation factor for the input gray level at the first refresh rate. The operations may also include determining, based on the compensation factor and for the input gray level, a modified gamma value for use by the device at a second refresh rate, wherein the modified gamma value reduces a perceived optical defect of the display panel when operating at the second refresh rate by maintaining a consistent delta difference in values for the optical property between the first and second refresh rates at different ambient brightness levels. The operations may further include storing, at the device, the modified gamma value for the input gray level, wherein subsequent to the storing, the device is configured to adjust input display data using the modified gamma value for the input gray level when the display panel is transitioning from the first refresh rate to the second refresh rate.

In a fourth aspect, an article of manufacture is provided. The article of manufacture may include a non-transitory computer-readable medium having stored thereon program instructions that, upon execution by one or more processors of a computing device, cause the computing device to carry out operations. The operations may include measuring, from a device having a display panel configured to operate at multiple refresh rates, first and second values for an optical property of the display panel for an input gray level at a first refresh rate, wherein the first and second values are measured at respective first and second ambient brightness levels. The operations may further include determining, based on the first and second values, a compensation factor for the input gray level at the first refresh rate. The operations may also include determining, based on the compensation factor and for the input gray level, a modified gamma value for use by the device at a second refresh rate, wherein the modified gamma value reduces a perceived optical defect of the display panel when operating at the second refresh rate by maintaining a consistent delta difference in values for the optical property between the first and second refresh rates at different ambient brightness levels. The operations may further include storing, at the device, the modified gamma value for the input gray level, wherein subsequent to the storing, the device is configured to adjust input display data using the modified gamma value for the input gray level when the display panel is transitioning from the first refresh rate to the second refresh rate.

In a fifth aspect, a computer-implemented method is provided. The method may include identifying an input gray level while a display panel of a device is operating at a first refresh rate, wherein the display panel is configured to operate at multiple refresh rates. The method may further include retrieving, from a storage at the device, a modified gamma value for the input gray level at a second refresh rate, and wherein the modified gamma value has been determined based on measured first and second values for an optical property of the display panel for the input gray level at the first refresh rate, wherein the first and second values are measured at respective first and second ambient brightness levels, and a determined compensation factor for the input gray level at the first refresh rate. The method may also include adjusting input display data using the modified gamma value for the input gray level. The method may further include transitioning, based on the adjusted input display data, the display panel from the first refresh rate to the second refresh rate, wherein the modified gamma value reduces a perceived optical defect of the display panel when operating at the second refresh rate by maintaining a consistent delta difference in values for the optical property between the first and second refresh rates at different ambient brightness levels.

In a sixth aspect, a system is provided. The system may include one or more processors. The system may also include data storage, where the data storage has stored thereon computer-executable instructions that, when executed by the one or more processors, cause the system to carry out operations. The operations may include identifying an input gray level while a display panel of a device is operating at a first refresh rate, wherein the display panel is configured to operate at multiple refresh rates. The operations may further include retrieving, from a storage at the device, a modified gamma value for the input gray level at a second refresh rate, and wherein the modified gamma value has been determined based on measured first and second values for an optical property of the display panel for the input gray level at the first refresh rate, wherein the first and second values are measured at respective first and second ambient brightness levels, and a determined compensation factor for the input gray level at the first refresh rate. The operations may also include adjusting input display data using the modified gamma value for the input gray level. The operations may further include transitioning, based on the adjusted input display data, the display panel from the first refresh rate to the second refresh rate, wherein the modified gamma value reduces a perceived optical defect of the display panel when operating at the second refresh rate by maintaining a consistent delta difference in values for the optical property between the first and second refresh rates at different ambient brightness levels.

In a seventh aspect, a device is provided. The device includes one or more processors operable to perform operations. The operations may include identifying an input gray level while a display panel of a device is operating at a first refresh rate, wherein the display panel is configured to operate at multiple refresh rates. The operations may further include retrieving, from a storage at the device, a modified gamma value for the input gray level at a second refresh rate, and wherein the modified gamma value has been determined based on measured first and second values for an optical property of the display panel for the input gray level at the first refresh rate, wherein the first and second values are measured at respective first and second ambient brightness levels, and a determined compensation factor for the input gray level at the first refresh rate. The operations may also include adjusting input display data using the modified gamma value for the input gray level. The operations may further include transitioning, based on the adjusted input display data, the display panel from the first refresh rate to the second refresh rate, wherein the modified gamma value reduces a perceived optical defect of the display panel when operating at the second refresh rate by maintaining a consistent delta difference in values for the optical property between the first and second refresh rates at different ambient brightness levels.

In an eighth aspect, an article of manufacture is provided. The article of manufacture may include a non-transitory computer-readable medium having stored thereon program instructions that, upon execution by one or more processors of a computing device, cause the computing device to carry out operations. The operations may include identifying an input gray level while a display panel of a device is operating at a first refresh rate, wherein the display panel is configured to operate at multiple refresh rates. The operations may further include retrieving, from a storage at the device, a modified gamma value for the input gray level at a second refresh rate, and wherein the modified gamma value has been determined based on measured first and second values for an optical property of the display panel for the input gray level at the first refresh rate, wherein the first and second values are measured at respective first and second ambient brightness levels, and a determined compensation factor for the input gray level at the first refresh rate. The operations may also include adjusting input display data using the modified gamma value for the input gray level. The operations may further include transitioning, based on the adjusted input display data, the display panel from the first refresh rate to the second refresh rate, wherein the modified gamma value reduces a perceived optical defect of the display panel when operating at the second refresh rate by maintaining a consistent delta difference in values for the optical property between the first and second refresh rates at different ambient brightness levels.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 6 depicts gamma tables, in accordance with example embodiments.

FIG. 8 is a table of calibrated gamma values for normal mode for various tap points, in accordance with example embodiments.

FIG. 9 is a table illustrating example compensation factors and delta luminance values, in accordance with example embodiments.

DETAILED DESCRIPTION

Figure 1:
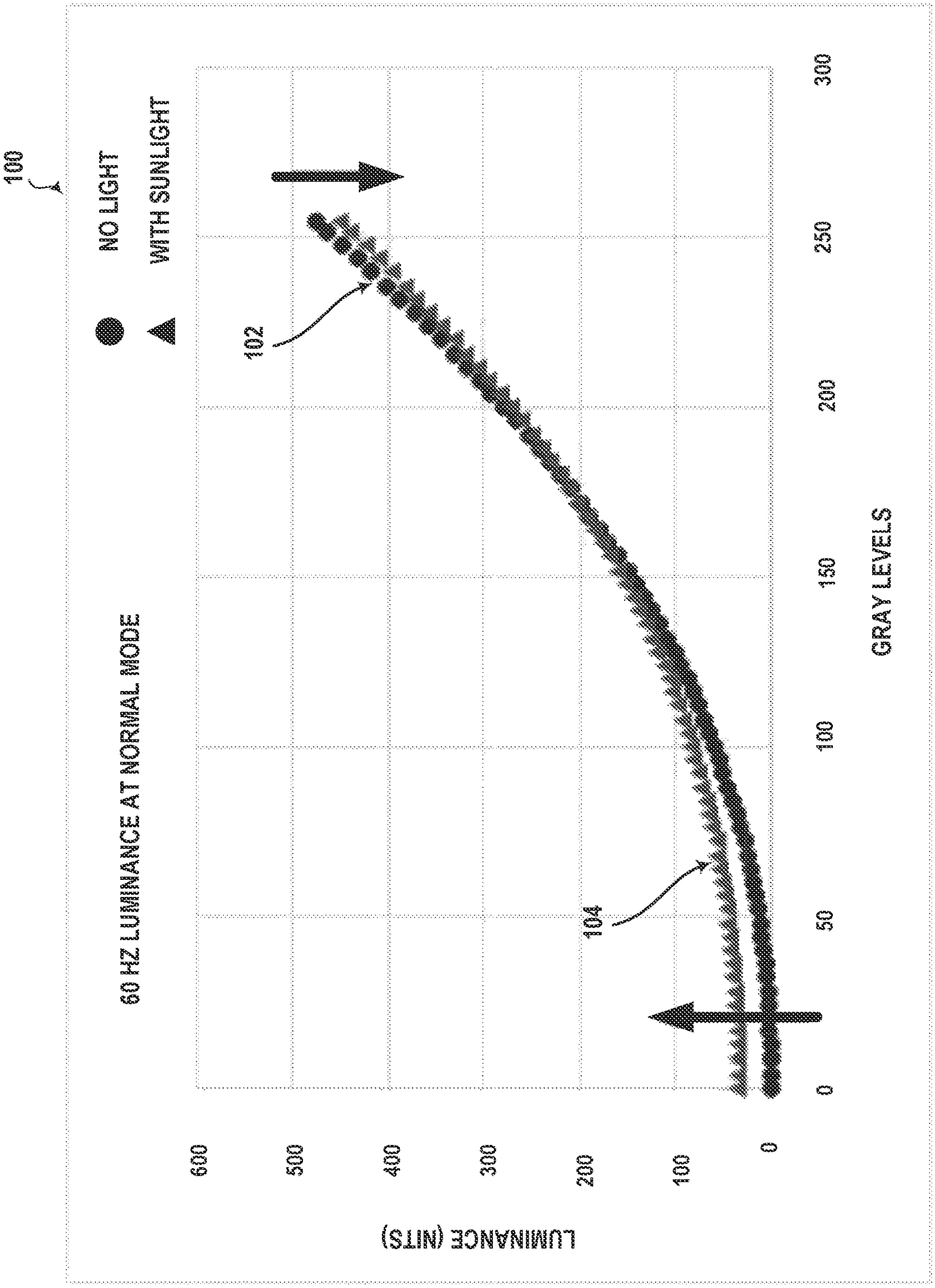
FIG. 1 is a graph illustrating values for an optical property for a refresh rate at normal mode under two ambient brightness levels, in accordance with example embodiments.

Example methods, devices, articles of manufacture, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

High display refresh rates (e.g., 90 Hz or 120 Hz) for a display panel of a computing device may be desirable when executing visually complex software applications, such as video or gaming applications. However, higher refresh rates also cause the computing device to consume more power. To strike a balance between performance and battery life, some display panels can operate at one of multiple different refresh rates (e.g., 10 Hz, 30 Hz, 60 Hz, 90 Hz, and 120 Hz). That is, depending on the application being executed, the display panel can switch between multiple refresh rates.

However, optical characteristics may differ between different refresh rates. Specifically, the luminance and color of a display panel may differ between 60 Hz and 90 Hz. When the display panel switches from 60 Hz to 90 Hz (and vice versa), this optical difference may manifest itself as a visual flicker on the display panel. Consequently, if the display panel frequently switches between 60 Hz and 90 Hz refresh rates, the visual flicker may become highly pronounced and detrimental to a user's experience. Further, because human eyes are highly sensitive to changes at low luminance settings, the visual flicker is especially noticeable when the luminance of the display panel is low and/or when the ambient light of the environment surrounding the display panel is low. In some devices, flicker may be observed under strong ambient light (e.g., sunlight). This may be caused, for example, by a photo-electric effect, such as, a thin film transistor (TFT) leakage due to photons. For example, when a brightness level for high brightness mode (HBM) is at 600 nits, flicker may be less noticeable. In some devices, when the brightness level for HBM is increased to 700 nits, flickering may be observed under strong ambient light. However, as the brightness level for the HBM is increased beyond 700 nits, flickering becomes more apparent.

FIG. 1 is a graph 100 illustrating values for an optical property for a refresh rate at normal mode under two ambient brightness levels, in accordance with example embodiments. For example, in graph 100, the vertical axis represents luminance as the optical property, measured in nits, with values ranging from 0 to 600 nits. Values are for a 60 Hz refresh rate. The horizontal axis represents gray levels ranging from 0 to 300. First curve 102 corresponds to luminance values for a first ambient brightness level (e.g., an ambient brightness level with no light), and curve 104 corresponds to luminance values for a second ambient brightness level with strong ambient light (e.g., sunlight). As displayed, between gray levels from 0 to 150, curve 104 is above curve 102. In order to reduce flicker, luminance values on curve 104 would need to be lowered to match those of curve 102. For gray levels between 150 and 300, curve 102 is above curve 104. In order to reduce flicker, luminance values on curve 104 would need to be increased to match those of curve 102. An image capturing device, such as a colorimeter, can be used to capture images at various gray levels for a fixed DBV band, and different refresh rates and ambient brightness levels.

One way to quantitatively measure a difference in luminance values is to determine a delta luminance value. For example, delta luminance may be calculated as follows:

$$\text{Delta Luminance} = \Delta L(60, 90) = \frac{\text{Luminance at 90 Hz} - \text{Luminance at 60 Hz}}{\text{Luminance at 60 Hz}} \qquad \text{(Eqn. 1)}$$

or as:

$$\text{Delta Luminance} = \Delta L(60, 90) = \frac{\text{Luminance at 90 Hz} - \text{Luminance at 60 Hz}}{\text{Luminance at 90 Hz}} \qquad \text{(Eqn. 2)}$$

Although the formulas in Eqns. 1 and 2 are based on 60 Hz and 90 Hz, similar formulas may be used for any two refresh rates, $R_1$, and $R_2$, to calculate $\Delta L(R_1, R_2)$. Also, for example, delta luminance values may be determined at different ambient brightness levels. For example, a first delta luminance can be determined under no ambient light, and a second delta luminance can be determined under strong ambient light (e.g., sunlight).

Figure 2:
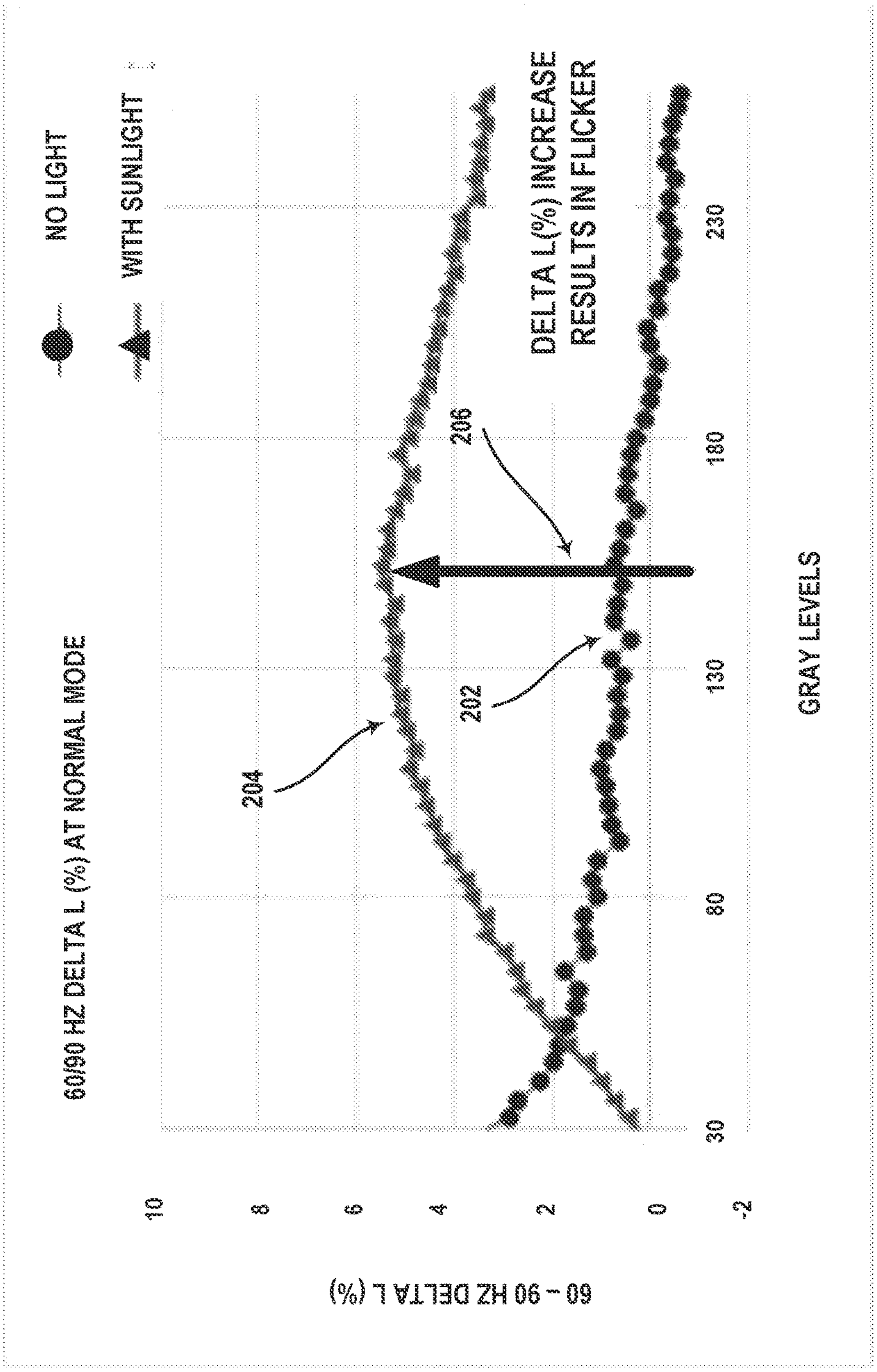
FIG. 2 is a graph illustrating delta luminance values for two refresh rates at normal mode under two ambient brightness levels, in accordance with example embodiments.

FIG. 2 is a graph 200 illustrating delta luminance values for two refresh rates at normal mode under two ambient brightness levels, in accordance with example embodiments. The vertical axis of graph 200 represents delta luminance values as a percentage, with values ranging from −2 to 10. The horizontal axis represents gray levels ranging from 30 to 230. Curve 202 corresponds to $\Delta L(60, 90)$ for a first ambient brightness level (e.g., an ambient brightness level with no light), and curve 204 corresponds to $\Delta L(60, 90)$ for a second ambient brightness level with strong ambient light (e.g., sunlight). As shown, the delta luminance values increase as the ambient brightness level increases, thereby causing flicker. Arrow 206 shows this phenomenon of a "luminance drift" with a change in the ambient brightness level.

Some solutions attempt to solve this "flicker problem" by disabling transitions between 60 Hz and 90 Hz when the luminance of the display panel is low. But an issue with these solutions is that the definition of what is considered "low display luminance" can be fairly high. In some example computing devices, the ideal transition threshold to alleviate all flickering has been found to be 75%. In other words, if the luminance of the display panel is at or above 75% of the total possible luminance of the display panel, then transitions between 60 Hz and 90 Hz may be permitted. And if the luminance of the display panel is below 75% of the total possible luminance, then transitions between 60 Hz and 90 Hz may not be permitted. But because users often keep the luminance of the display panel below 75%, minimum benefits of using multiple refresh rates are obtained.

One way to achieve a smooth transition of a display panel from a first refresh rate to a second refresh rate is to minimize a difference in an optical property of the display panel during the transition at all gray levels and brightness settings. The term, "optical property" as used herein may refer to any measurable property of an image displayed by a device. For example, the optical property may refer to a color or luminance value of a display panel when an image is displayed by the device, or when a device transitions between different refresh rates. Also, for example, an optical property may refer to properties such as, for example, levels of refraction, absorption, scattering, reflection, and so forth.

Generally, values for an optical property (e.g., color and luminance) can be calibrated at factory and stored in a display drive integrated circuit (DDIC). In some instances, a blocking zone may be applied to disable transitions of a display panel between refresh rates when the display is at low brightness and low gray levels. Generally, as the brightness level for HBM increases, more flickering may become perceptible, and more blocking zones may be needed to reduce flickering. However, it is desirable to remove blocking zones and enable transitions for all brightness and gray levels, so as to enhance user experience at higher refresh rates (e.g., 90 Hz).

One possible solution to the flickering problem, as described herein, can be directed to minimizing the luminance drift, i.e., the change in delta luminance values under different ambient brightness settings. Some techniques described herein address these issues by modifying a gamma value based on a compensation factor for the input gray level. Input display data may be adjusted based on the modified gamma value for an input gray level when the display panel of a device is transitioning from the first refresh rate to the second refresh rate. After applying these adjustments, the optical property of the display panel (e.g., color, luminance, etc.) when operating at 60 Hz may become similar to the optical property of the display panel when operating at 90 Hz, and thus the visual flicker that occurs when switching between 60 Hz and 90 Hz may become less pronounced.

To facilitate this, first and second values for an optical property of the display panel for an input gray level at a first refresh rate may be measured for the display panel. The first and second values may be measured at respective first and second ambient brightness levels. Then, based on the measured first and second values, a compensation factor for the input gray level at the first refresh rate may be determined. The modified gamma value may be determined based on the compensation factor and for the input gray level, for use by the device at a second refresh rate. The modified gamma value reduces a perceived optical defect of the display panel when operating at the second refresh rate by maintaining a consistent delta difference in values for the optical property between the first and second refresh rates at different ambient brightness levels. The modified gamma value for the input gray level may be stored at the device. Subsequently, the device can be configured to adjust input display data using the modified gamma value for the input gray level when the display panel is transitioning from the first refresh rate to the second refresh rate.

In some embodiments, the measuring of the first and second values, the determining of the compensation factor, and the determining of the modified gamma value, may be performed for a given display brightness mode for the display panel. For example, the measuring of the first and second values, the determining of the compensation factor, and the determining of the modified gamma value, may be performed for normal mode. Also, for example, the measuring of the first and second values, the determining of the compensation factor, and the determining of the modified gamma value, may be performed for the high brightness mode (HBM).

Generally, TFT leakage triggered by a photon is proportional to the input light. As input light increases, the leakage increases. In one aspect, for a given input gray level $Gray_x$ and a given refresh rate, values for an optical property (e.g., luminance values) can be measured for different brightness settings. For example, at a first refresh rate (e.g., 60 Hz), compensation ratio may be determined as:

$$\text{Compensation Ratio}(Gray_x) = \frac{\text{Luminance }(Gray_x)_{second\ brightness\ level}}{\text{Luminance }(Gray_x)_{first\ brightness\ level}} \quad \text{(Eqn. 3)}$$

where $Gray_x$ corresponds to the input gray level, the second brightness level can correspond to measurements with sunlight, and the first brightness level can correspond to measurements without sunlight.

Figure 3A:
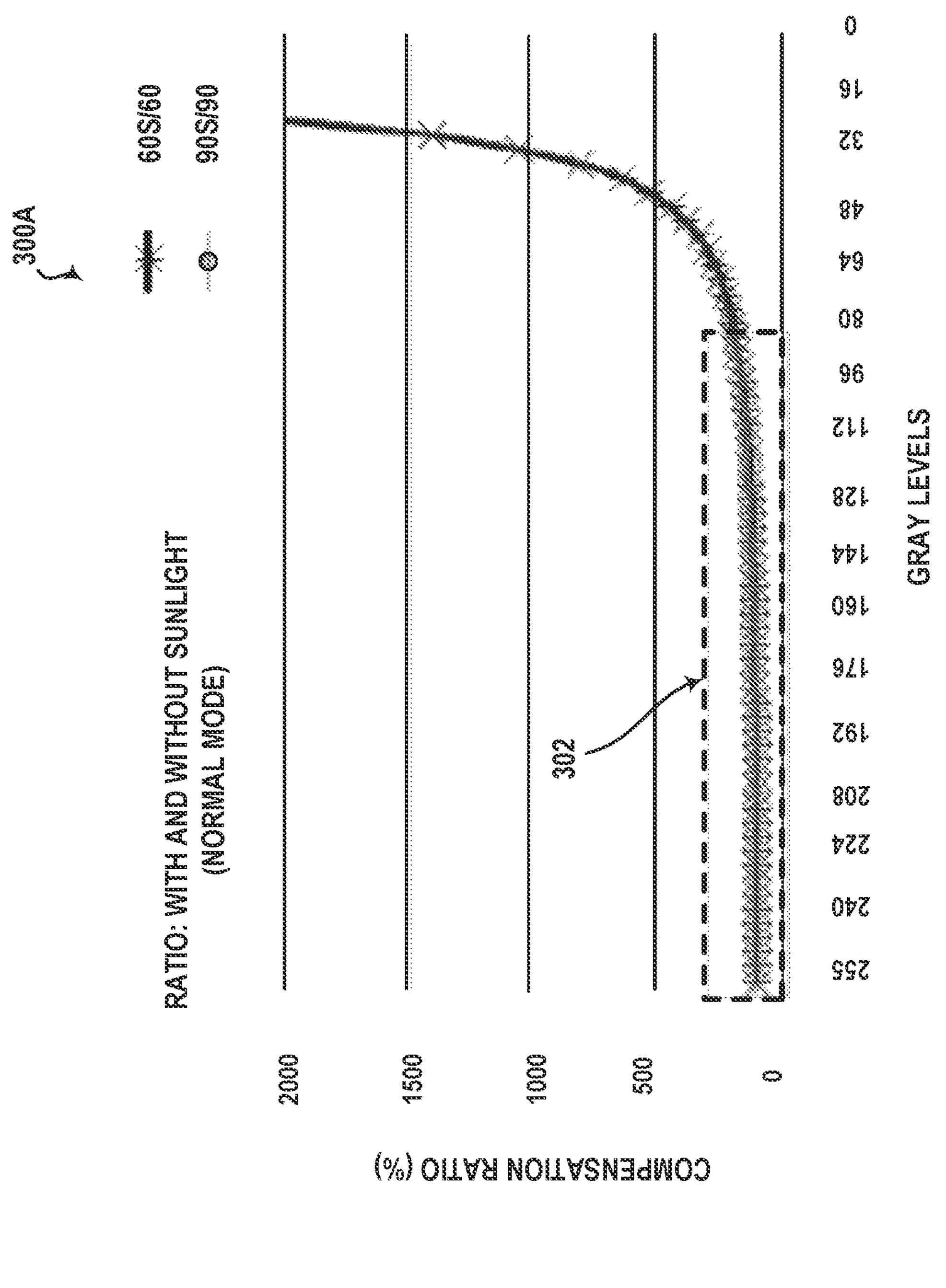
FIG. 3A is a graph illustrating compensation ratios at different refresh rates for normal mode, in accordance with example embodiments.

FIG. 3A is a graph 300A illustrating compensation ratios at different refresh rates for normal mode, in accordance with example embodiments. For example, for normal mode, a compensation ratio at 60 Hz may be computed (e.g., via Eqn. 3) as a ratio of luminance values with sunlight (60S) to luminance values without sunlight (60). Likewise, for normal mode, a compensation ratio at 90 Hz may be computed (e.g., via Eqn. 3) as a ratio of luminance values with sunlight (90S) to luminance values without sunlight (90). Graph 300A displays a vertical axis for compensation ratios as percentage values in the range 0% to 2000%, and a horizontal axis for gray level values in the range from 0 to 255. As illustrated in graph 300A, curves for compensation ratios at 60 Hz and 90 Hz have similar shapes, albeit with different values. An enlarged view of a portion of graph b 300A, bounded by bounding box 302, is shown in FIG. 3B to highlight the different values.

Figure 3B:
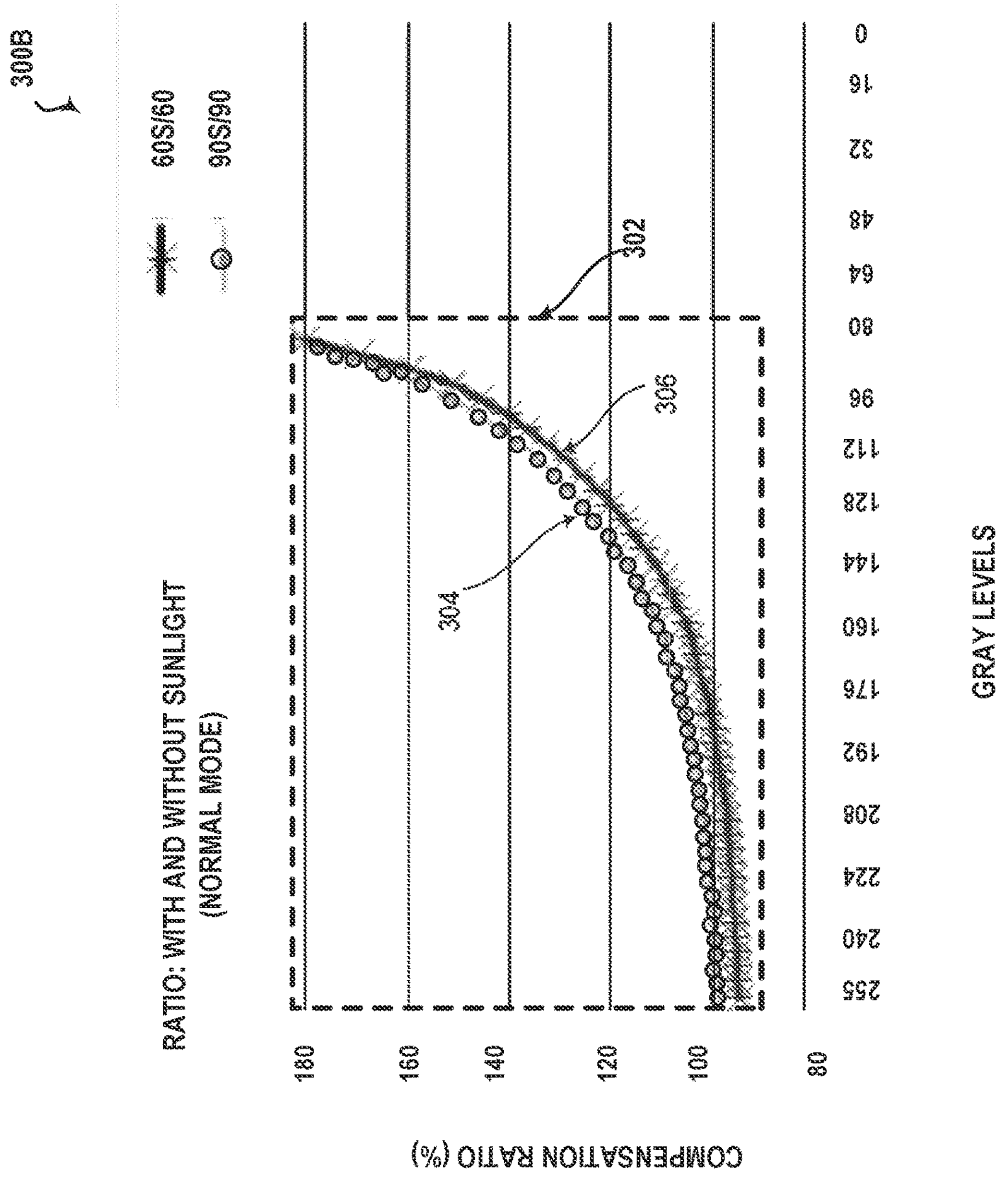
FIG. 3B is another graph illustrating compensation ratios at different refresh rates for normal mode, in accordance with example embodiments.

FIG. 3B is another graph 300B illustrating compensation ratios at different refresh rates for normal mode, in accordance with example embodiments. Graph 300B displays a vertical axis for compensation ratios as percentage values in the range 0% to 180%, and a horizontal axis for gray level values in the range from 0 to 255. FIG. 3B highlights the difference in values between compensation ratios at 60 Hz and 90 Hz for normal mode. In particular, FIG. 3B illustrates the portion of graph 300A of FIG. 3A within bounding box 302. For example, curve 304 corresponds to the compensation ratios at 90 Hz, and curve 306 corresponds to the compensation ratios at 60 Hz. As illustrated, curve 304 lies above curve 306 for gray levels in the range 80 to 255.

Figure 4A:
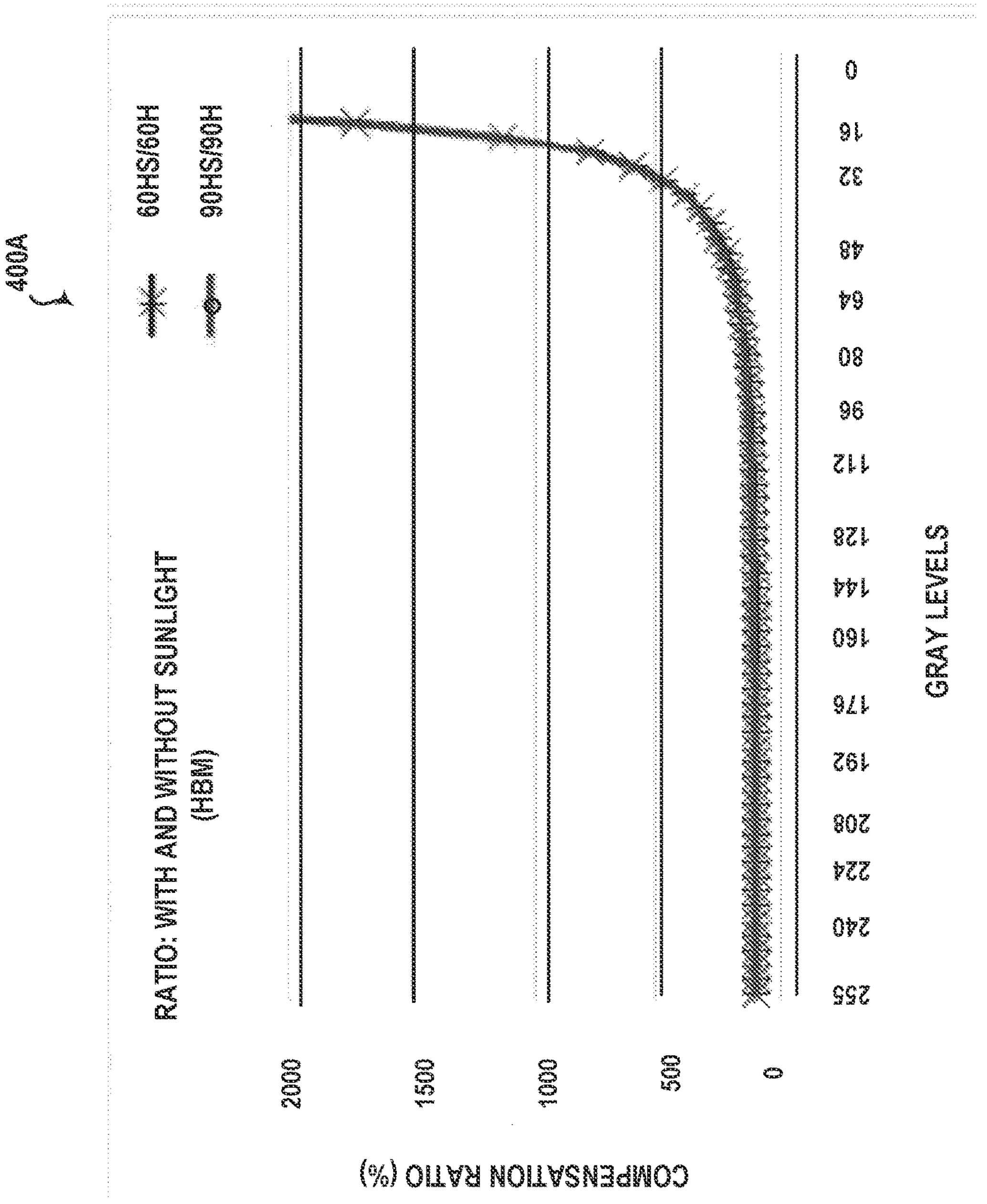
FIG. 4A is a graph illustrating compensation ratios at different refresh rates for high brightness mode, in accordance with example embodiments.

FIG. 4A is a graph 400A illustrating compensation ratios at different refresh rates for high brightness mode, in accordance with example embodiments. For example, for high brightness mode (HBM), a compensation ratio at 60 Hz may be computed (e.g., via Eqn. 3) as a ratio of luminance values with sunlight (60HS) to luminance values without sunlight (60H). Likewise, for HBM, a compensation ratio at 90 Hz may be computed (e.g., via Eqn. 3) as a ratio of luminance values with sunlight (90HS) to luminance values without sunlight (90H). Graph 400A displays a vertical axis for compensation ratios as percentage values in the range 0% to 2000%, and a horizontal axis for gray level values in the range from 0 to 255. As illustrated in graph 400A, curves for compensation ratios at 60 Hz and 90 Hz have similar shapes.

Figure 4B:
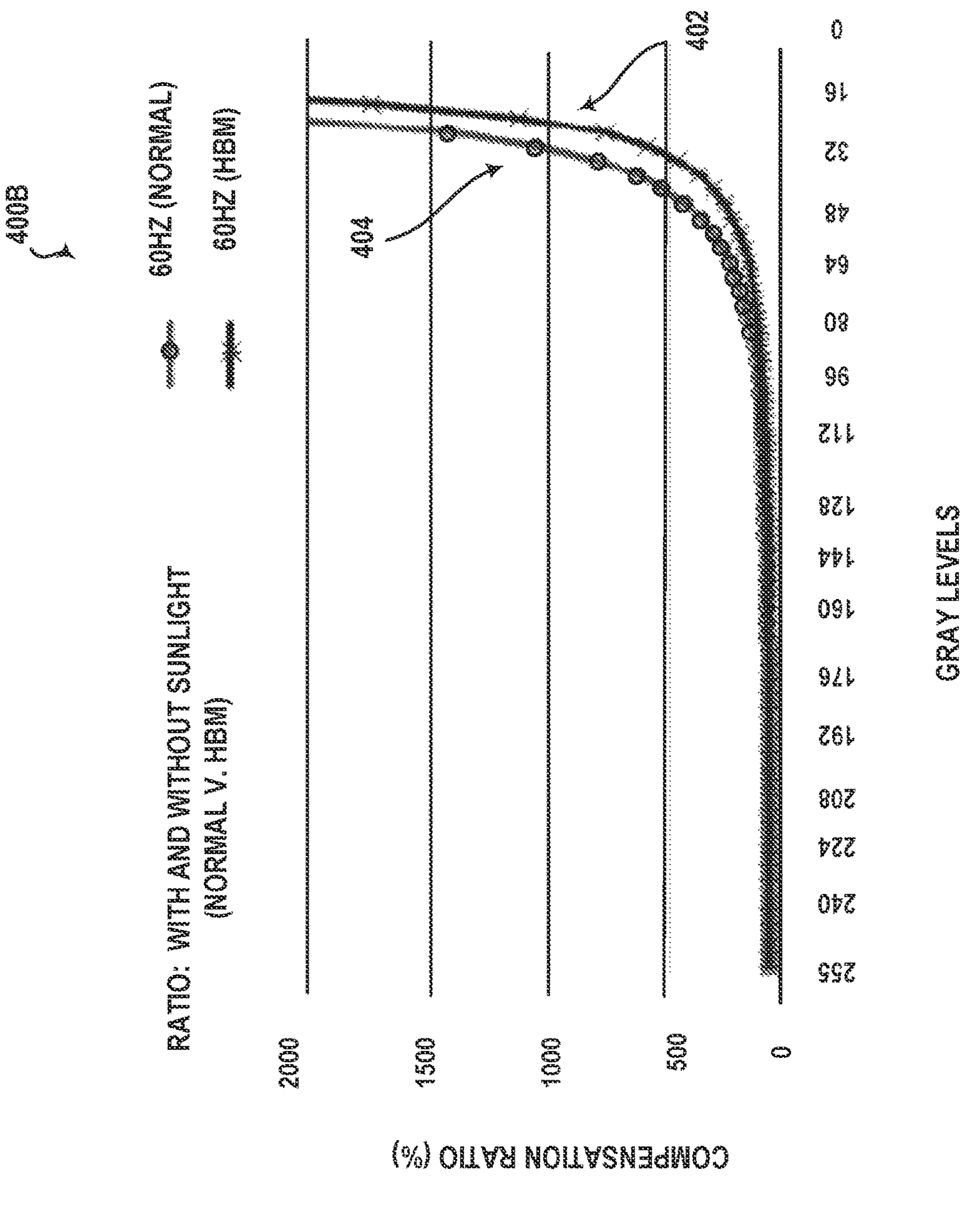
FIG. 4B is a graph illustrating compensation ratios at 60 Hz for normal mode and for high brightness mode, in accordance with example embodiments.

FIG. 4B is a graph 400B illustrating compensation ratios at 60 Hz for normal mode and for high brightness mode, in accordance with example embodiments. For example, for normal mode, a compensation ratio at 60 Hz may be computed (e.g., via Eqn. 3) as a ratio of luminance values with sunlight to luminance values without sunlight. Curve 404 displays values for these compensation ratios. Likewise, for HBM, a compensation ratio at 60 Hz may be computed (e.g., via Eqn. 3) as a ratio of luminance values with sunlight to luminance values without sunlight. Curve 402 displays values for these compensation ratios. Graph 400B displays a vertical axis for compensation ratios as percentage values in the range 0% to 2000%, and a horizontal axis for gray level values in the range from 0 to 255. As indicated, at low gray levels, curve 404 lies above curve 402, indicating that the compensation ratios at 60 Hz for normal mode are higher than the compensation ratios at 60 Hz for HBM.

II. Example Techniques for Modifying Gamma Values

Compensation ratios at 90 Hz for normal mode and HBM have similar characteristics. Accordingly, adjustments for gamma values would be needed for each brightness mode. For example, one set of gamma adjustments would compensate for 90 Hz compensation ratios for normal mode, and a second set of gamma adjustments would compensate for 90 Hz compensation ratios for HBM. For purposes of illustration only, as described herein, compensation ratios at 60 Hz may be used to re-calibrate gamma values for 90 Hz. However, compensation ratios for any given refresh rate can be used as a benchmark to re-calibrate gamma values for other refresh rates.

Figure 5:
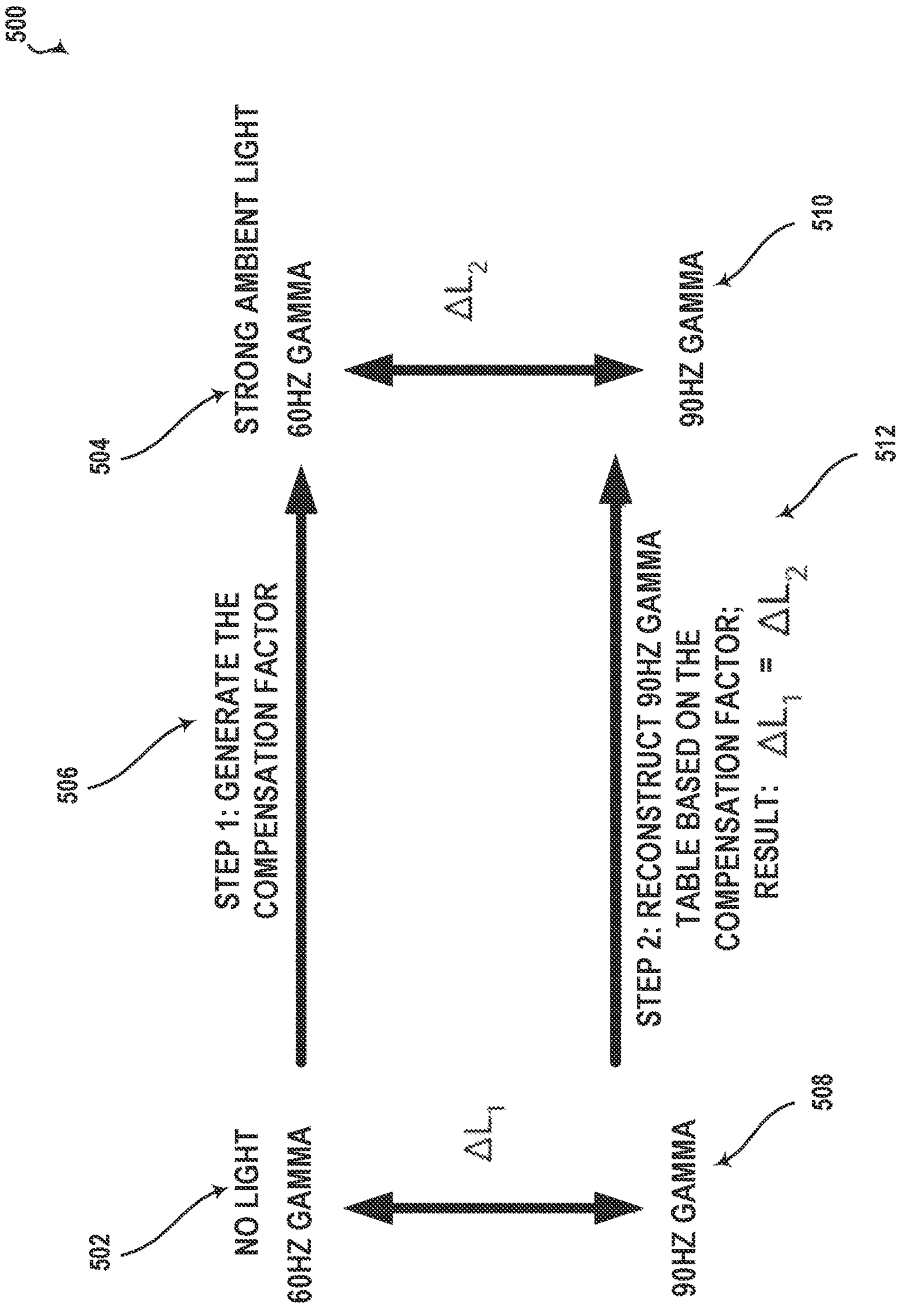
FIG. 5 is a diagram illustrating modification of gamma values, in accordance with example embodiments.

FIG. 5 is a diagram 500 illustrating modification of gamma values, in accordance with example embodiments. At 502, luminance values at a first refresh rate and a first ambient brightness level may be determined. For example, luminance values at 60 Hz and with no ambient light may be determined. At 504, luminance values at the first refresh rate and a second ambient brightness level may be determined. For example, luminance values at 60 Hz and under strong ambient light may be determined. At 506, as a first step, a compensation factor for the first refresh rate (e.g., 60 Hz) may be determined (e.g., determine a compensation ratio via Eqn. 3).

At 508, luminance values at a second refresh rate and the first ambient brightness level may be determined. For example, luminance values at 90 Hz and with no ambient light may be determined. At 510, luminance values at the second refresh rate and the second ambient brightness level may be determined. For example, luminance values at 90 Hz and under strong ambient light may be determined. At 512, as a second step, gamma values for the second refresh rate (e.g., 90 Hz) can be modified based on the compensation factor determined in the first step 506. For example, a gamma table for the second refresh rate (e.g., 90 Hz) may be reconstructed based on the compensation factor determined at step 506. As a consequence of this modification, a first delta luminance, $\Delta L_1$, between the first refresh rate (e.g., 60 Hz) and the second refresh rate (e.g., 90 Hz) under no ambient light, can become identical to a second delta luminance, $\Delta L_2$, between the first refresh rate (e.g., 60 Hz) and the second refresh rate (e.g., 90 Hz) under strong ambient light. In some embodiments, the delta luminance may be determined via Eqns. 1 or 2. This leads to an elimination of flicker when a display device transitions from a first refresh rate (e.g., 60 Hz) to a second refresh rate (e.g., 90 Hz), irrespective of the ambient light.

Accordingly, by using the herein-described techniques, multiple refresh rates can be utilized while reducing or eliminating any flickering effect. Other advantages are also contemplated and will be appreciated from the discussion herein.

FIG. 6 depicts gamma table 600 and gamma table 610, in accordance with example embodiments. In line with the discussion above, a computing device (e.g., computing device 1200 of FIG. 12) could use gamma table 600 and 610 to compensate for inaccuracies that may occur when displaying images on a display panel (e.g., display panel 1210 of FIG. 12) of the computing device. Both gamma table 600 and 610 could be stored within a gamma circuitry (e.g., gamma adjustment circuitry 1220 of FIG. 12) of the computing device. In examples herein, a computing device (e.g., computing device 1200 of FIG. 12) may utilize gamma table 600 when a display panel (e.g., display panel 1210 of FIG. 12) is operating at a first refresh rate (e.g., 60 Hz), and may utilize gamma table 610 when the display panel is operating at a second refresh rate (e.g., 90 Hz).

As shown, the gamma values in gamma table 600 may differ from the gamma values in gamma table 610. For instance, tap point 602, which includes an optical property (e.g., in luminance or color) for DVB band 7 and input gray level G7 when display panel 1210 is operating at 60 Hz, has a value of 0.172. In contrast, tap point 612, which includes an optical property (e.g., in luminance or color) for DVB band 7 and input gray level G7 when display panel 1210 is operating at 90 Hz, has a value of 0.184. As discussed above, the differences between gamma values at corresponding tap points of gamma table 600 and 610 (e.g., 0.184−0.172=0.012) are considered herein as "delta luminances."

To make refresh rate changes between 60 Hz and 90 hz appear less conspicuous to users, it may be desirable to modify the gamma values in gamma table 610 (or gamma table 600) so that a consistent delta difference in values for the optical property between 60 Hz and 90 Hz at different ambient brightness levels can be maintained across all input gray levels. Because human eyes are highly sensitive to changes at low luminance settings, some embodiments may involve modifying gamma values only for threshold low input gray levels; for instance, only for input gray levels at or below G48.

Figure 12:
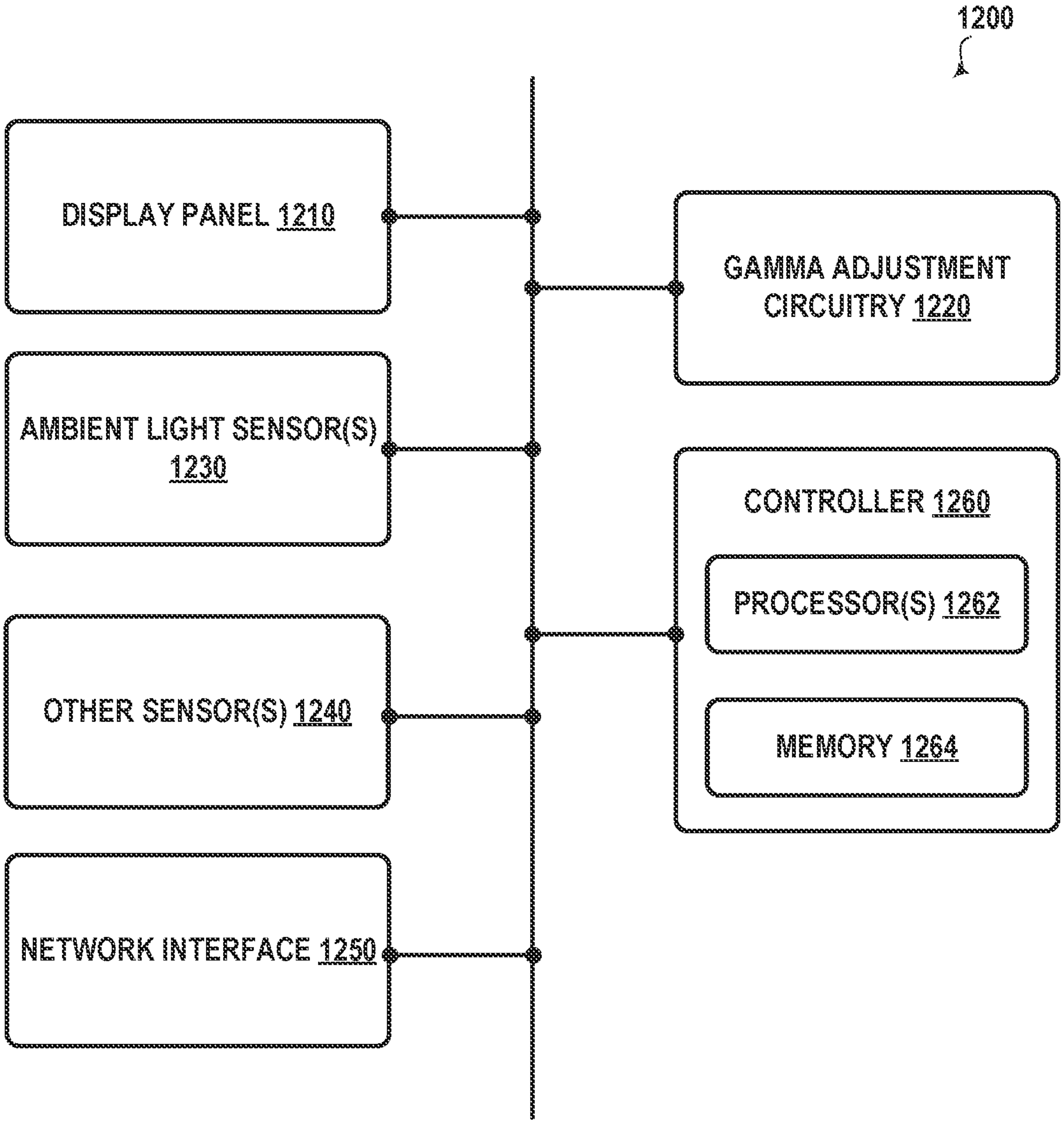
FIG. 12 illustrates a computing device, in accordance with example embodiments.

To modify gamma values of tap points in gamma table 610, some implementations involve altering one or more register values in a gamma circuitry (e.g., gamma adjustment circuitry 1220 of FIG. 12) of a computing device (e.g., computing device 1200 of FIG. 12). For instance, the gamma circuitry (e.g., gamma adjustment circuitry 1220 of FIG. 12) could include a set of hardware registers for each tap point in gamma table 610. The gamma circuitry (e.g., gamma adjustment circuitry 1220 of FIG. 12) could use the values in these registers to alter the input gray levels signals sent by a controller (e.g., controller 1260 of FIG. 12) to a display panel. Generally speaking, the number of hardware registers for a given tap point corresponds to the number of color channels used by a display panel. For example, if the display panel (e.g., display panel 1210 of FIG. 12) used RGB color channels, then the gamma circuitry (e.g., gamma adjustment circuitry 1220 of FIG. 12) may contain three hardware registers for a given tap point, each of the three registers corresponding to one of the RGB color channels.

Tables 600 and 610 illustrate seven display brightness value (DBV) bands, DBV band 1 to DBV band 7. The DBVs control brightness settings of a display panel. Each DBV band corresponds to a brightness level setting. For example, band 7 controls brightness settings from a luminance of 111 nits to a luminance of 500 nits, band 6 controls brightness settings from a luminance of 51 nits to a luminance of 110 nits, band 5 controls brightness settings from a luminance of 26 nits to a luminance of 50 nits, and so forth. Generally, each image pixel of a digital image may have a numerical value that represents the luminance (e.g., brightness or darkness) of the digital image at a particular spot in a display. These numerical values may be referred to as "gray levels." The number of gray levels may depend on the number of bits used to represent the numerical values. For example, if 8 bits were used to represent a numerical value, a display panel may provide 256 gray levels, with a numerical value of 0 corresponding to full black and a numerical value of 255 corresponding to full white. As a more specific example, a controller (e.g., controller 1260 of FIG. 12) may provide to the display component a digital image stream containing 24 bits, with 8 bits corresponding to a gray level for each of the red, green, and blue color channels of a pixel group.

To enable accurate control of brightness levels, each DBV band may also have a plurality of gray levels that are designated as gamma control points ("tap points"). For example, as illustrated in tables 600 and 610, each DBV band has register tap points at gray level G7, gray level G12, gray level G24, gray level G37, and so forth. The tap points may range from gray level G255 to G7. For each tap point, a device may be configured with a control or a knob to control the pixel values of red, green, and blue (RGB). The RGB ratio can be balanced between 60 and 90 Hz. Each DBV band and gray level corresponds to a brightness value.

For example, in table 610, at DBV band 7 and gray level G7, the brightness value is 0.184 nits, at DBV band 6 and gray level G7, the brightness value reduces to 0.04 nits. At DBV band 1 and gray level G7, the brightness value reduces to 0.0001 nits.

The cells in tables 600 and 610 are of two types based on the brightness settings: a first type of cells are those that are at a high level of brightness, and are indicated without any shading. The brightness settings in these cells can be accurately configured (e.g., by a device manufacturer). For example, at DBV band 7, with a luminance of 500 nits, brightness levels at all tap points can be accurately configured for the device, except at a tap point of G7. Similarly, at DBV band 6, with a luminance of 610 nits, brightness levels at all tap points can be accurately configured for the device, except at tap points G7 and G15.

A second type of cells are those that are at a low level of brightness. These cells are indicated with shading. For example, at DBV band 6, tap point G15 corresponds to a low brightness setting. As another example, at DBV band 5, tap points G7, G15 and G23 correspond to a low brightness setting. For these DBV bands and tap points, the brightness levels may not be accurately configured by a manufacturer, and adjustments to respective gamma values at 90 Hz are needed to reduce optical defects (this is described in more detail below). The adjusted gamma values can then be stored in the device (e.g., as a lookup table), and used at run time to modify luminance settings as the device transitions from a first refresh rate (e.g., 60 Hz) to a second refresh rate (e.g., 90 Hz).

For higher DBV bands and larger brightness values, devices can be accurately configured with brightness settings, and transitions may occur smoothly. As illustrated in table 610, brightness values are very small for low DBV bands and low gray levels. Equipment in factories are generally not able to accurately measure such brightness levels, such as, for example, when the brightness values are less than 0.055 nits. Therefore, transitions between refresh rates may be blocked for such low brightness values and low DBV bands in an effort to reduce optical defects such as flickering.

As described herein, in some embodiments, the measuring of the first and second values, the determining of the compensation factor, and the determining of the modified gamma value, may be performed for a given display brightness band for the display panel.

Figure 7:
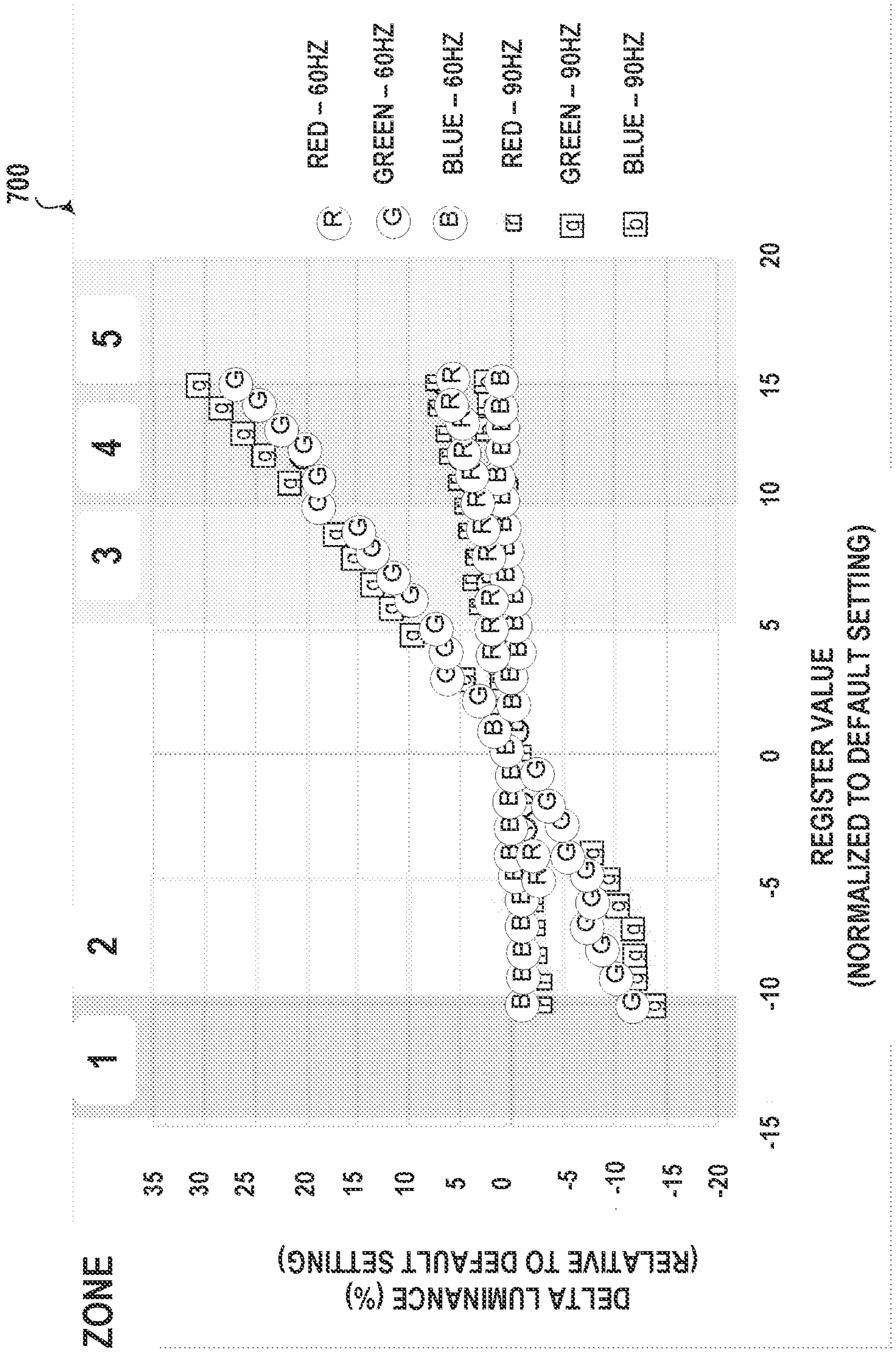
FIG. 7 is a graph illustrating a relationship between register values and delta luminance values, in accordance with example embodiments.

As an illustrative example, FIG. 7 is a graph 700 illustrating a relationship between register values and delta luminance values, in accordance with example embodiments. Various trend lines appear on graph 700. Each of these trend lines captures a specific relationship between the register values and delta luminance values for (i) a given color channel and (ii) a given refresh rate. For instance, the green trend line with circular dots captures a relationship between register values and delta luminance values for the green color channel at refresh rate 60 Hz. On the other hand, the green line with asterisk marks captures a relationship between register values and delta luminance values for the green color channel at refresh rate 90 Hz. These relationships may be default relationships that are configured by the manufacturer of a display panel of a computing device (e.g., computing device 1200 of FIG. 12).

III. Example Modifications of Gamma Values

In order to modify gamma values in gamma table 610, a compensation factor for an input gray level could be applied so that a perceived optical defect of the display panel when operating at 90 Hz by maintaining a consistent delta difference in values for the optical property between 60 Hz and 90 Hz at different ambient brightness levels.

FIG. 8 is a table 800 of calibrated gamma values for normal mode for various tap points, in accordance with example embodiments. For example, an image capturing device, such as a colorimeter, can be used to capture images at various tap points and a given mode, under different ambient brightness settings, and at different refresh rates. In normal mode, there are nine (9) tap points at a maximum brightness DBV band. For example, the tap points in normal mode may correspond to 7, 12, 24, 37, 54, 91, 160, 216, and 244. Generally, tap points are registers that function as tuning points to adjust display brightness. In some embodiments, for a device having a display panel configured to operate at multiple refresh rates, an optical property of the display panel can be measured for an input gray level at a first refresh rate and a first ambient brightness level. Generally, images can be captured for the normal mode at different tap points indicated in first column C1 805. Based on luminance values at 60 Hz under no ambient light and under strong ambient light, a target compensation ratio may be determined (e.g., via Eqn. 3) for normal mode.

For example, for normal mode, an image can be displayed on a device for a given tap point at a first refresh rate (e.g., 60 Hz) and a first ambient brightness setting (e.g., no light), and a colorimeter can capture the image and measure the luminance values. Then, the optical property of the display panel can be measured for the image at the first refresh rate (e.g., 60 Hz) and a second ambient brightness setting (e.g., sunlight), and a colorimeter can capture the image and measure the luminance values. Based on such measurements, a target compensation ratio at 60 Hz may be determined (e.g., 60S/60), as illustrated in FIGS. 3A and 3B, and as displayed in second column C2 810.

Likewise, for normal mode, an image can be displayed on a device for a given tap point at a second refresh rate (e.g., 90 Hz) and the first ambient brightness setting (e.g., no light), and a colorimeter can capture the image and measure the luminance values. Then, the optical property of the display panel can be measured for the image at the second refresh rate (e.g., 90 Hz) and a second ambient brightness setting (e.g., sunlight), and a colorimeter can capture the image and measure the luminance values. Based on such measurements, a default compensation ratio at 90 Hz may be determined (e.g., 90S/90), as illustrated in FIGS. 3A and 3B, and as displayed in third column C3 815.

In some embodiments, determining of the modified gamma value may include determining, for a given display brightness value and a given brightness mode and based on the compensation factor, a target value for the optical property at the second ambient brightness level and at the second refresh rate. For example, based on the compensation factor (e.g., values in second column C2 810 for a target ratio at 60 Hz, denoted Target $\text{Ratio}_{60S/60}$), a default luminance value under no light at 90 Hz, denoted Default $\text{Luminance}_{90}$, a target luminance value under strong ambient light can be determined at 90 Hz.

Fourth column C4 820 of table 800 lists default luminance values under no light at 90 Hz. Based on values in second column C2 810 for a target ratio at 60 Hz, denoted Target $\text{Ratio}_{60S/60}$, in third column C3 815 for a default ratio at 90 Hz, denoted Default $\text{Ratio}_{90S/90}$, and in fourth column C4 820 for a default luminance value under sunlight at 90 Hz, denoted Default $\text{Luminance}_{90S}$, a target luminance value under strong ambient light can be determined at 90 Hz, denoted Target $\text{Luminance}_{90S}$ as illustrated in fifth column C5 825, and as follows:

$$\text{Target Luminance}_{90S} = \frac{\text{Target Ratio}_{60S/60}}{\text{Default Ratio}_{90S/90}} \times \text{Default Luminance}_{90S} \quad \text{(Eqn. 4)}$$

Such a determination of target luminance values displayed in in fifth column C5 825, based on the target ratios displayed in second column C2 810, is indicated by arrow 2 in FIG. 8. For example, row 840 indicates values for tap point 7, as indicated by first column C1 805. As indicated in second column C2 810, the target compensation ratio at 60 Hz, is Target $\text{Ratio}_{60S/60}$=146.4679. As indicated in third column C3 815, the default ratio at 90 Hz is Default $\text{Ratio}_{90S/90}$=120.5902. As indicated in fourth column C4 820, the default luminance value under no light at 90 Hz is Default $\text{Luminance}_{90S}$=35.55. Accordingly, applying Eqn. 4, the target luminance value at tap point 7 under strong ambient light at 90 Hz can be determined as:

$$\text{Target Luminance}_{90S} = \frac{146.4679}{120.5902} \times 35.55 = 43.17875, \quad \text{(Eqn. 5)}$$

as indicated in row 840 under fifth column C5 825.

As another example, row 842 indicates values for tap point 54, as indicated by first column C1 805. As indicated in second column C2 810, the target compensation ratio at 60 Hz, is Target $\text{Ratio}_{60S/60}$=3.3123. As indicated in third column C3 815, the default ratio at 90 Hz is Default $\text{Ratio}_{90S/90}$=3.324362. As indicated in fourth column C4 820, the default luminance value under no light at 90 Hz is Default $\text{Luminance}_{90S}$=48.17. Accordingly, applying Eqn. 4, the target luminance value at tap point 54 under strong ambient light at 90 Hz can be determined as:

$$\text{Target Luminance}_{90S} = \frac{3.3123}{3.324362} \times 48.17 = 47.99522, \quad \text{(Eqn. 6)}$$

as indicated in row 842 under fifth column C5 825.

In some embodiments, the method may further determining, for the given display brightness value and the given brightness mode at the second ambient brightness level and at the second refresh rate, a ratio of the target value for the optical property to a default value for the optical property. For example, for a given tap point, and for normal mode and under sunlight, a ratio of the target luminance value at the tap point to the default luminance value may be determined. The modified gamma value may be determined by multiplying the default gamma value with the ratio as determined, as described in Eqn. 7.

For example, sixth column C6 830 of table 800 also illustrates example default register values for the various tap points under strong ambient light at 90 Hz, denoted Default $\text{Register}_{90S}$, and seventh column C7 835 illustrates example calibrated register values for the various tap points under strong ambient light at 90 Hz, denoted Calibrated $\text{Register}_{90S}$. The calibrated register values (or modified gamma values) under strong ambient light at 90 Hz may be determined as follows:

$$\text{Calibrated Register}_{90S} = \frac{\text{Target Luminance}_{90S}}{\text{Default Luminance}_{90}} \times \text{Default Register}_{90S} \quad \text{(Eqn. 7)}$$

Such a determination of calibrated register values (or modified gamma values) displayed in seventh column C7 835, based on the target luminance values displayed in fifth column C5 825, is indicated by arrow 3 in FIG. 8. For example, row 840 indicates values for tap point 7, as indicated by first column C1 805. As indicated in sixth column C6 830, the default register value for tap point 7 under strong ambient light at 90 Hz is Default $\text{Register}_{90S}$=54. As indicated in fourth column C4 820, the default luminance value under no light at 90 Hz is Default $\text{Luminance}_{90}$=35.55, and as determined in Eqn. 5 and as indicated in fifth column C5 825, the target luminance value at tap point 7 under strong ambient light at 90 Hz is Target $\text{Luminance}_{90S}$=43.17875 Accordingly, applying Eqn. 7, the calibrated register value at tap point 7 under strong ambient light at 90 Hz can be determined as:

$$\text{Calibrated Register}_{90S} = \frac{43.17875}{35.5} \times 54 = 65.59, \quad \text{(Eqn. 8)}$$

which may be rounded to 65, as indicated in row 840 under seventh column C7 835.

As another example, row 842 indicates values for tap point 54, as indicated by first column C1 805. As indicated in sixth column C6 830, the default register value for tap point 54 under strong ambient light at 90 Hz is Default $\text{Register}_{90S}$=73. As indicated in fourth column C4 820, the default luminance value under no light at 90 Hz is Default $\text{Luminance}_{90}$=48.17, and as determined in Eqn. 6 and as indicated in fifth column C5 825, the target luminance value at tap point 54 under strong ambient light at 90 Hz is Target $\text{Luminance}_{90S}$=47.99522 Accordingly, applying Eqn. 7, the calibrated register value at tap point 54 under strong ambient light at 90 Hz can be determined as:

$$\text{Calibrated Register}_{90S} = \frac{47.99522}{48.17} \times 73 = 72.735, \quad \text{(Eqn. 9)}$$

which may be rounded to 72, as indicated in row 842 under seventh column C7 835.

In order to determine luminance values at different tap points, refresh rates, ambient light settings, and modes, images can be analyzed for the values. For example, values for an optical property may be measured from the cross-section of an image. In some instances, depending on how the colorimeter is calibrated, the measurement of a brightness level may not be an absolute value of the brightness level, but may be a relative value between the two refresh rates. In some embodiments, one or more optical properties can be measured at each refresh rate, and these measured values can be used individually, or in combination, to determine calibrated register values. For example, the calibrated register value can be determined based on luminance values, color, and/or a combination of the two. Additional and/or alternative optical properties can be used. Also, for example, different measurements can be determined for various optical viewing distances and/or viewing angles, and such measurements can be appropriately normalized and/or averaged. For purposes of clarity, the examples herein refer to a specific optical property such as luminance.

Techniques described for normal mode may be applied for the high brightness mode as well. For example, a table analogous to table 800 can be constructed for HBM, and Eqns. 4 and 7 can be applied to values corresponding to HBM to determine calibrated register values for HBM. Also, for example, although the description is based on 60 Hz and 90 Hz, similar techniques may be applied to any pair of refresh rates. Also, for example, although the discussion is based on a low ambient brightness level (e.g., no light) and a strong ambient brightness level (e.g., sunlight), similar techniques may be applicable to any ambient brightness level.

The techniques described herein may also be applicable to determining, based on the compensation factor and for the input gray level, a modification of a second default gamma value used by the device at a third refresh rate (e.g., 120 Hz). Similar to the processes described herein, based on a compensation factor for a first refresh rate (e.g., 60 Hz), a modified second gamma value can be determined for the third refresh rate (e.g., 120 Hz). The modified second gamma value may reduce a perceived optical defect of the display panel when operating at the third refresh rate (e.g., 120 Hz) by maintaining a consistent delta difference in values for the optical property between the first (e.g., 60 Hz) and third (e.g., 120 Hz) refresh rates at different ambient brightness levels. During runtime, the device can be configured to adjust the input display data using the modified second gamma value for the input gray level when the display panel is transitioning from the first refresh rate to the third refresh rate. Also, for example, similar to the processes described herein, modified gamma values can be determined for input gray levels to reduce a perceived optical defect of the display panel when operating at the third refresh rate (e.g., 120 Hz) by maintaining a consistent delta difference in values for the optical property between the second (e.g., 90 Hz) and third (e.g., 120 Hz) refresh rates at different ambient brightness levels.

The term "input display data" as used herein, generally refers to values that are used for a display. For example, when the optical value is luminance, the input display data can be the luminance values (or brightness settings) at various gray levels. As another example, when the optical property is color, the input display data can be the respective values assigned to each pixel for red, blue and green colors. Each optical property can be associated with an input display data, and such data can be adjusted and/or calibrated.

To make refresh rate changes between 60 Hz and 90 Hz appear less conspicuous to users, it may be desirable to modify the gamma values in a gamma table so that the delta luminances between 60 Hz and 90 Hz, on average, remain identical across ambient brightness settings. Because human eyes are highly sensitive to changes at low luminance settings, some embodiments may involve modifying gamma values only for threshold low input gray levels; for instance, only for input gray levels at or below G48.

To modify gamma values of tap points in table 800, some implementations involve altering one or more register values in gamma adjustment circuitry 1220 of FIG. 12. For instance, referring to FIG. 12, gamma adjustment circuitry 1220 could include a set of hardware registers for each tap point in table 800. Gamma adjustment circuitry 1220 could use the values in these registers to alter the input gray levels signals sent by controller 1260 to display panel 1210. Generally speaking, the number of hardware registers for a given tap point corresponds to the number of color channels used by display panel 1210. For example, if display panel 1210 used RGB color channels, then gamma adjustment circuitry 1220 may contain three hardware registers for a given tap point, each of the three registers corresponding to one of the RGB color channels.

FIG. 9 is a table 900 illustrating example compensation factors and delta luminance values, in accordance with example embodiments. First column C1 905 lists various input gray levels. Second column C2 910 lists default luminance values under normal mode at 60 Hz for a low ambient brightness level (e.g., no ambient light), which may be denoted as Default $\text{Luminance}_{60}$. Third column C3 915 lists default luminance values under normal mode at 60 Hz for a high ambient brightness level (e.g., sunlight), which may be denoted as Default $\text{Luminance}_{60S}$. A compensation factor may be determined utilizing Eqn. 3 as a ratio of values for high ambient brightness in third column C3 915 denoted as Default $\text{Luminance}_{60S}$, to values for low ambient brightness in second column C2 910 denoted as Default $\text{Luminance}_{60}$. Such compensation factors are listed in fourth column C4 920. Note that the compensation factor is the same as the target ratio, Target $\text{Ratio}_{60S/60}$, listed in column C3 810 of FIG. 8. For example:

$$\text{Target Ratio}_{60S/60} = \frac{\text{Delta Luminance}_{60S}}{\text{Delta Luminance}_{60}} \quad \text{(Eqn. 10)}$$

For example, row 955 illustrates example values for an input gray level of 252, as indicated in first column C1 905. Second column C2 910 of row 955 displays a default luminance value under normal mode at 60 Hz for a low ambient brightness level as 464.3. Third column C3 915 of row 955 displays a default luminance value under normal mode at 60 Hz for a high ambient brightness level as 439. Accordingly, a compensation factor (or the target ratio, Target $\text{Ratio}_{60S/60}$) can be determined as 439/464.3=0.9455, as indicated in row 955 in fourth column C4 920.

Fifth column C5 925 lists default luminance values under normal mode at 90 Hz for a low ambient brightness level (e.g., no ambient light), which may be denoted as Default $\text{Luminance}_{90}$. Sixth column C6 930 lists default luminance values under normal mode at 90 Hz for a high ambient brightness level (e.g., sunlight), which may be denoted as Default $\text{Luminance}_{90S}$. A modified luminance value (or a target luminance Target $\text{Luminance}_{90S}$ as listed in column C5 830 of FIG. 8) under normal mode at 90 Hz for a high ambient brightness level (e.g., sunlight) may be determined to reduce a perceived optical defect of the display panel when operating at the 90 Hz by maintaining a consistent delta difference in values for the optical property between 60 Hz and 90 Hz at different ambient brightness levels. Such values are displayed in seventh column C7 935. Generally, compensation factors in fourth column C4 920 are obtained as a ratio of luminance values at 60 Hz under sunlight to luminance values at 60 Hz under no light, or as Default $\text{Luminance}_{60S}$/Default $\text{Luminance}_{60}$. Accordingly, to reduce optical defects, it is desirable to have similar compensation factors for luminance values at 90 Hz under sunlight to luminance values at 90 Hz under no light. Accordingly, values in seventh column C7 935 may be determined by applying the compensation factor determined in fourth column C4 920 to the default luminance values under normal mode at 90 Hz for a low ambient brightness level (e.g., no ambient light) in fifth column C5 925. For example, $$\text{Target Luminance}_{90S} = \text{Target Ratio}_{60S/60} \times \text{Default Luminance}_{90} \quad \text{(Eqn. 11)}$$

For example, with reference to row 955 of table 900, the compensation factor, as determined, is given as Target $\text{Ratio}_{60S/60}$=0.9455 (as displayed in fourth column C4 920). Also, the default luminance value under normal mode at 90 Hz under no light is given as Default $\text{Luminance}_{90}$=461.9 (as displayed in fifth column C5 925). Accordingly, a modified luminance value under normal mode at 90 Hz under sunlight may be determined by multiplying the two values, 0.9455×461.9=436.73, as displayed in seventh column C7 935 of row 955. The target luminance in Eqn. 4 and Eqn. 11 are identical:

$$\begin{aligned}\text{Target Luminance}_{90S} &= \text{Target Ratio}_{60S/60} \times \text{Default Luminance}_{90} = \text{Target Ratio}_{60S/60} \times \text{Default Luminance}_{90} \times \frac{\text{Delta Luminance}_{90S}}{\text{Delta Luminance}_{90S}} = \\ &\text{Target Ratio}_{60S/60} \times \text{Delta Luminance}_{90S} \times \frac{\text{Delta Luminance}_{90}}{\text{Delta Luminance}_{90S}} = \frac{\text{Target Ratio}_{60S/60}}{\text{Target Ratio}_{90S/90}} \times \text{Delta Luminance}_{90S}\end{aligned} \quad \text{(Eqn. 12)}$$

Delta luminance values may be determined, for example, by using Eqn. 1 or 2. For example, under no ambient light, a first delta luminance, $\Delta L_1$, can be determined based on the default luminance value under normal mode at 90 Hz under no light (denoted Default $\text{Luminance}_{90}$ and displayed in fifth column C5 925), and the default luminance value under normal mode at 60 Hz under no light (denoted Default $\text{Luminance}_{60}$ and displayed in second column C2 910). These values for the first delta luminance are displayed in eighth column C8 940. For example, taking values from row 955, the first delta luminance, $\Delta L_1$, can be determined as:

$$\begin{aligned}\Delta L_1(60, 90) &= \frac{\text{Default Luminance}_{90} - \text{Default Luminance}_{60}}{\text{Default Luminance}_{60}} \times 100\% = \\ &\frac{461.9 - 464.3}{464.3} \times 100\% = \frac{-2.4}{464.3} \times 100\% = -0.52\end{aligned} \quad \text{(Eqn. 13)}$$

as indicated in eighth column C8 940 of row 955.

A default second delta luminance value under sunlight may be determined in like manner. For example, a default second delta luminance, Default $\Delta L_2$, can be determined based on the default luminance value under normal mode at 90 Hz under sunlight (denoted Default $\text{Luminance}_{90S}$ and displayed in sixth column C6 930), and the default luminance value under normal mode at 60 Hz under sunlight (denoted Default $\text{Luminance}_{60S}$ and displayed in third column C3 915). These values for the default second delta luminance are displayed in ninth column C9 945. For example, taking values from row 955, the default second delta luminance, $\Delta L_2$, can be determined as:

$$\begin{aligned}\text{Default } \Delta L_2(60, 90) &= \frac{\text{Default Luminance}_{90S} - \text{Default Luminance}_{60S}}{\text{Default Luminance}_{60S}} \times 100\% = \\ &\frac{454.2 - 439}{439} \times 100\% = \frac{15.2}{439} \times 100\% = 3.46\end{aligned} \quad \text{(Eqn. 14)}$$

as indicated in ninth column C9 945 of row 955. As can be seen, a comparison of $\Delta L_1$ with value −0.52 from Eq. 13 and Default $\Delta L_2$ with value 3.46 in Eqn. 14 indicates a discrepancy between the two ambient brightness settings. Generally, it is desirable to maintain identical values for $\Delta L_1$ and $\Delta L_2$.

Upon re-computing the default second delta luminance value based on the modified luminance value under normal mode at 90 Hz under sunlight (denoted Target Luminance$_{90S}$ and displayed in seventh column C7 935), and the default luminance value under normal mode at 60 Hz under sunlight (as displayed in third column C3 915), identical values for $\Delta L_1$ and $\Delta L_2$ may be obtained, as illustrated in tenth column C10 950. For example, taking values from row 955, the second delta luminance, $\Delta L_2$, can be determined as:

$$\Delta L_2(60, 90) = \frac{\text{Target Luminance}_{90S} - \text{Default Luminance}_{60S}}{\text{Default Luminance}_{60S}} \times 100\% = \frac{436.73 - 439}{439} \times 100\% = \frac{-2.27}{439} \times 100\% = -0.52 \quad \text{(Eqn. 15)}$$

as indicated in tenth column C10 950 of row 955. This value of −0.52 obtained in Eqn. 15 is identical to the value obtained in Eqn. 13. Accordingly, after an adjustment of luminance values under normal mode at 90 Hz under sunlight (as displayed in seventh column C7 935), identical values for $\Delta L_1$ and $\Delta L_2$ may be obtained. For example, using Eqn. 10 and Eqn. 11:

$$\frac{\text{Target Luminance}_{90S} - \text{Default Luminance}_{60S}}{\text{Default Luminance}_{60S}} = \frac{\text{Target Ratio}_{60S/60} \times \text{Default Luminance}_{90} - \text{Target Ratio}_{60S/60} \times \text{Default Luminance}_{60}}{\text{Target Ratio}_{60S/60} \times \text{Default Luminance}_{60}} = \frac{\text{Default Luminance}_{90} - \text{Default Luminance}_{60}}{\text{Default Luminance}_{60}} \quad \text{(Eqn. 16)}$$

Multiplying both sides of Eqn. 16 by 100% gives the identity $\Delta L_1 = \Delta L_2$.

Figure 10:
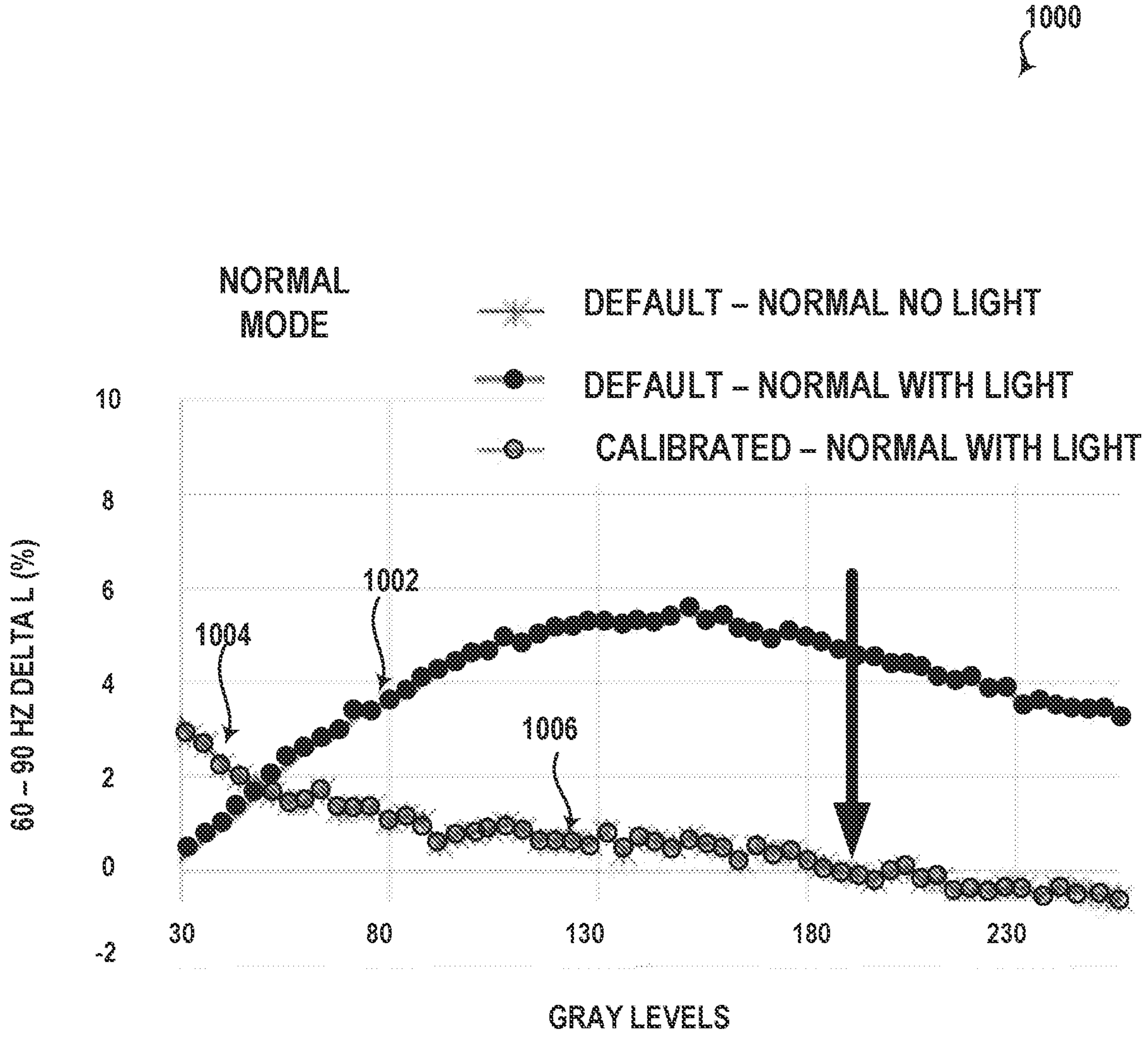
FIG. 10 is a graph illustrating delta luminance values for normal mode before and after calibration, in accordance with example embodiments.

FIG. 10 is a graph 1000 illustrating delta luminance values for normal mode before and after calibration, in accordance with example embodiments. The vertical axis of graph 1000 corresponds to delta luminance values in percentage, ranging from −2 to 10. The horizontal axis corresponds to gray levels ranging from 30 to 255. Curve 1002 displays default delta luminance values for normal mode, Default $\Delta L_2$, as displayed in ninth column C9 945 of FIG. 9. Curve 1004 corresponds to first delta luminance values, $\Delta L_1$, as displayed in eighth column C8 940 of FIG. 9. As illustrated, and consistent with the discussion with reference to Eqns. 10 and 11, curves 1002 and 1004 are separated, thereby indicating that the delta luminance values are not identical prior to calibration.

Also, for example, curve 1006 corresponds to second delta luminance values, $\Delta L_2$, as displayed in tenth column C10 950 of FIG. 9. As illustrated, and consistent with the discussion with reference to Eqns. 10 and 12, curves 1004 and 1006 coincide, thereby indicating that the delta luminance values are identical after calibration.

Figure 11:
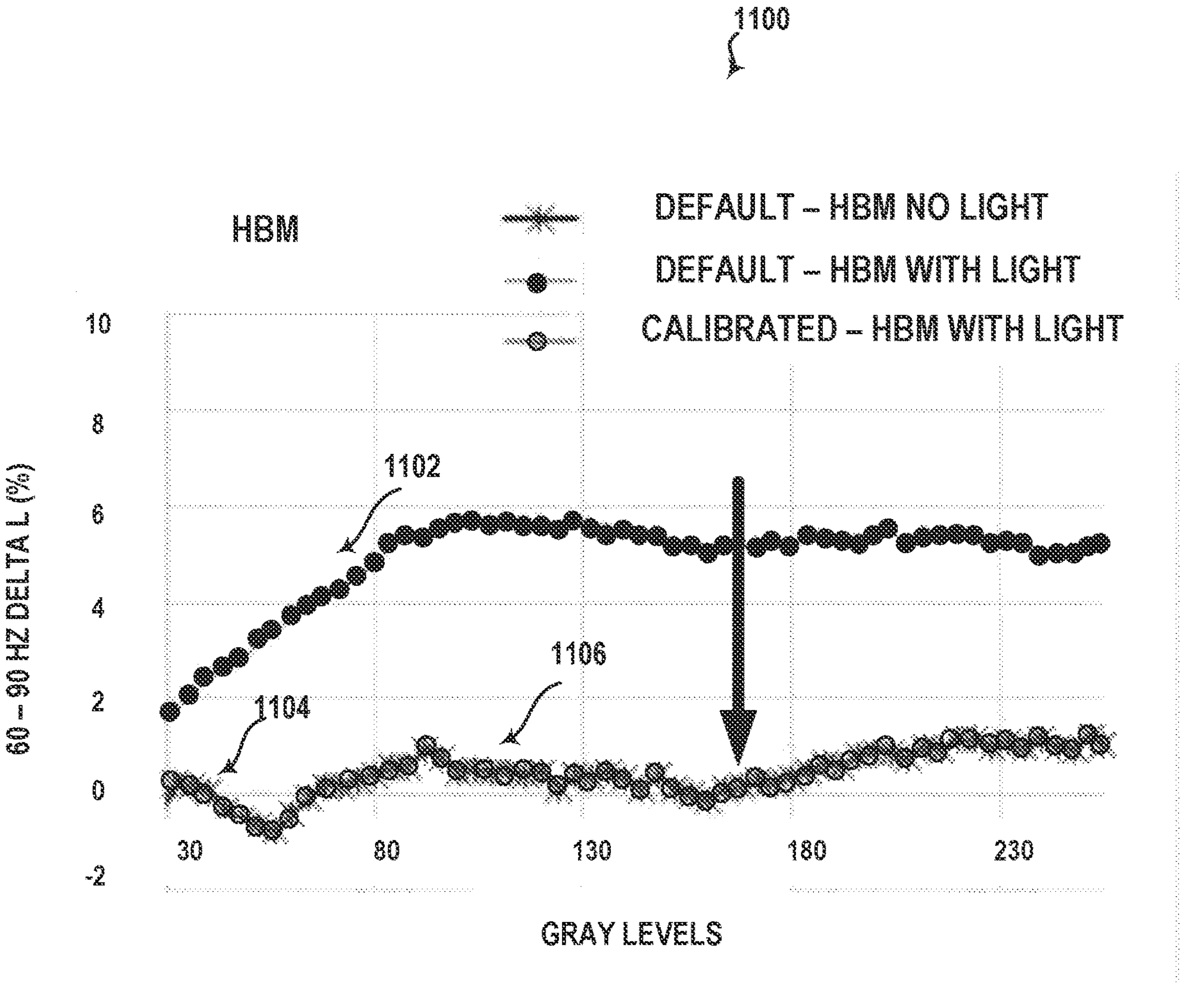
FIG. 11 is a graph illustrating delta luminance values for high brightness mode (HBM) before and after calibration, in accordance with example embodiments.

FIG. 11 is a graph 1100 illustrating delta luminance values for HBM before and after calibration, in accordance with example embodiments. The vertical axis of graph 1100 corresponds to delta luminance values in percentage, ranging from −2 to 10. The horizontal axis corresponds to gray levels ranging from 30 to 255. Although values and computations for HBM are not described herein, graph 1100 indicates that similar results are obtained for HBM. For example, curve 1102 displays default delta luminance values, Default $\Delta L_2$, for HBM. Curve 1104 corresponds to first delta luminance values, $\Delta L_1$ for HBM. As illustrated, curves 1102 and 1104 are separated, thereby indicating that the delta luminance values are not identical prior to calibration. Also, for example, curve 1106 corresponds to second delta luminance values, $\Delta L_2$ for HBM. As illustrated, curves 1004 and 1006 coincide, thereby indicating that the delta luminance values for HBM are identical after calibration.

In some embodiments, the modified gamma values may be stored in the device, wherein subsequent to the storing, the device is configured to adjust input display data using the modified gamma value for the input gray level when the display panel is transitioning from the first refresh rate to the second refresh rate (or a third refresh rate). In some embodiments, the process of updating register values for an input gray level occurs until the delta luminance for the input gray level is less than a predefined threshold. In some examples, the predefined threshold in a range between 5% and 95%. For instance the predefined threshold may be 5%, 10%, or 90%.

In certain embodiments, the process of updating register values for an input gray level occurs until: (i) the delta luminance for the input gray level is less than a predefined threshold, and (ii) the delta color difference for the input gray level is less than a predefined color threshold, where the color difference is measured as a linear combination of the squared difference between the u' at 90 Hz and at 60 Hz and the squared difference between the v' at 90 Hz and at 60 Hz, where u' and v' are color coordinates in CIELUV color space. For example, the color difference can be measured as:

$$\Delta(u',v') = \sqrt{(u'_{90Hz} - u'_{60Hz})^2 + (v'_{90Hz} - v'_{60Hz})^2} \quad \text{(Eqn. 17)}$$

In some instances, the predefined color threshold is 0.4%, i.e., it may be desirable to keep Δ(u', v') to be less than 0.004. In some instances, even if delta luminance is small, but the color difference is big, an optical defect may remain perceptible. Accordingly, to achieve better results, in some embodiments, both luminance and color may need to be adjusted. During measurements of an optical property, both luminance and color changes can be recorded and/or monitored. The color difference can be measured similar to how a delta luminance is measured.

IV. Example Devices

FIG. 12 illustrates computing device 1200, in accordance with example embodiments. Computing device 1200 includes display panel 1210, gamma adjustment circuitry 1220, one or more ambient light sensors 1230, one or more other sensors 1240, network interface 1250, and controller 1260. In some examples, computing device 1200 may take the form of a desktop device, a server device, or a mobile device. Computing device 1200 may be configured to interact with an environment. For example, computing device 1200 may obtain environmental state measurements associated with an environment around computing device 1200 (e.g., temperature measurements, ambient light measurements, etc.).

Display panel 1210 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display panel 1210 may also be configured to generate audible outputs, such as with a speaker, speaker jack, audio output port, audio output device, earphones, and/or other similar devices. Display panel 1210 may further be configured with one or more haptic components that can generate haptic outputs, such as vibrations and/or other outputs detectable by touch and/or physical contact with computing device 1200.

In example embodiments, display panel 1210 is configured to provide output signals at a given refresh rate. The refresh rate may correspond to the number of times display panel 1210 updates with new content each second. For example, a 60 Hz refresh rate may mean that display panel 1210 updates 60 times per second. In example embodiments, display panel 1210 may operate at a 60 Hz, a 90 Hz, or a 120 Hz refresh rate, among other possibilities.

In certain embodiments, display panel 1210 may be a color display utilizing a plurality of color channels for generating images. For example, display panel 1210 may utilize red, green, and blue (RGB) color channels, or cyan, magenta, yellow, and black (CMYK) color channels, among other possibilities. As described herein, gamma adjustment circuitry 1220 may adjust input display data using a corresponding gray level for the input gray level when the display panel 1210 is transitioning from the first refresh rate to the second refresh rate. As further described herein, gamma adjustment circuitry 1220 may adjust the gamma characteristics for each of the color channels of display panel 1210, as described with reference to at least FIGS. 5, 8, and 9.

In some embodiments, display panel 1210 may include a plurality of pixels disposed in a pixel array defining a plurality of rows and columns. For example, if display panel 1210 had a resolution of 1024×600, each column of the array may include 600 pixels and each row of the array may include 1024 groups of pixels, with each group including a red, blue, and green pixel, thus totaling 3072 pixels per row. In example embodiments, the color of a particular pixel may depend on a color filter that is disposed over the pixel.

In example embodiments, display panel 1210 may receive image data from controller 1260 and correspondingly send signals to its pixel array in order to display the image data. To send image data to display panel 1210, controller 1260 may first convert a digital image into numerical data that can be interpreted by display panel 1210. For instance, a digital image may contain various image pixels that correspond to respective pixels of display panel 1210. Each image pixel of the digital image may have a numerical value that represents the luminance (e.g., brightness or darkness) of the digital image at a particular spot. These numerical values may be referred to as "gray levels." The number of gray levels may depend on the number of bits used to represent the numerical values. For example, if 8 bits were used to represent a numerical value, display panel 1210 may provide 256 gray levels, with a numerical value of 0 corresponding to full black and a numerical value of 255 corresponding to full white. As a more specific example, controller 1260 may provide to display panel 1210 a digital image stream containing 24 bits, with 8 bits corresponding to a gray level for each of the red, green, and blue color channels of a pixel group.

In some cases, the luminance characteristics of images displayed by display panel 1210 may be depicted inaccurately when perceived by users. Such inaccuracies may result from the non-linear response of the human eye and could cause inaccurate portrayals of color/luminance on display panel 1210 from the viewpoint of users. To compensate for such inaccuracies, computing device 1200 could use gamma adjustment circuitry 1220.

Gamma adjustment circuitry 1220 may include circuitry that could compensate for inaccuracies that occur when displaying images on display panel 1210. To do this, gamma adjustment circuitry 1220 may include memory 1264 for storing one or more gamma curves/tables. The values in each curve/table may be determined based upon the transmittance sensitivities of display panel 1210 over a range of input gray levels.

Figure 13A:
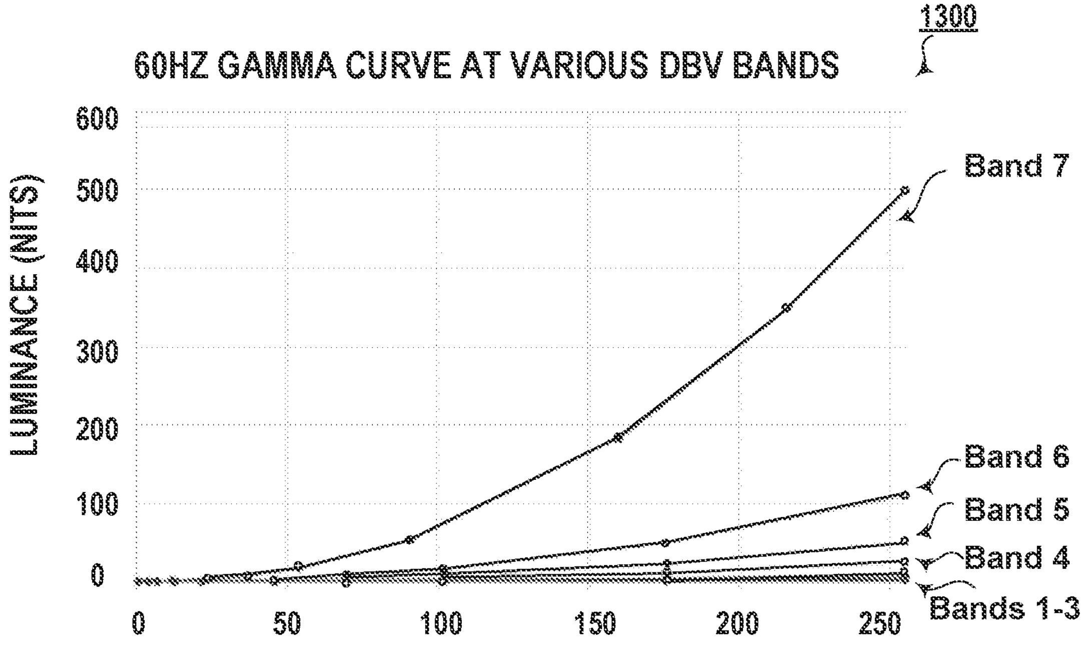
FIG. 13A is a graph illustrating 60 Hz gamma curves for various DBV bands, in accordance with example embodiments.

FIG. 13A is a graph 1300 illustrating 60 Hz gamma curves for various DBV bands, in accordance with example embodiments. As an illustrative example, FIG. 13A depicts graph 1300 that includes various gamma curves. Each gamma curve may correspond to a display brightness value (DBV) band. The use of a particular DBV band (and thus a particular gamma curve) may be based on user input. For instance, a user may select, perhaps by interacting with a brightness adjustment bar, a maximum brightness for display panel 1210. Based on that maximum brightness, display panel 1210 may choose a corresponding DBV band (and thus a corresponding gamma curve) to compensate for inaccuracies that occur when displaying images.

As shown in graph 1300, each gamma curve includes a relationship between input gray levels (on the x-axis) and luminance of a viewable image displayed on display panel 1210 (on the y-axis). These relationships are non-linear. For instance, in band 7, an input gray level of 1300 corresponds to a luminance value of 300 nits. Consequently, by using a gamma curve to adjust input gray levels, the images displayed on display panel 1210 may exhibit a non-linear luminance to input gray level relationship. Yet, when viewed by a user, the response of the human eye may cause the user to perceive the displayed images as having a linear relationship between luminance and input gray level. Thus, by using gamma curves, display panel 1210 is able to produce images that may be perceived by a user as having a generally linear relationship with regard to input gray level and luminance.

Figure 13B:
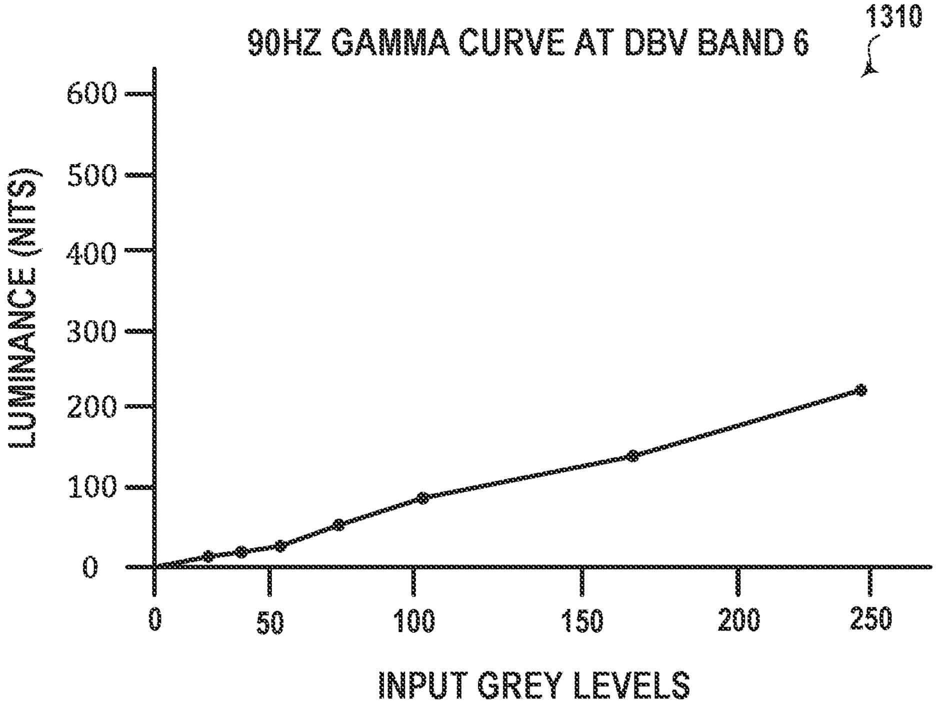
FIG. 13B is a graph illustrating a 90 Hz gamma curve for DBV band 6, in accordance with example embodiments.

Display panel 1210 could use different gamma curves depending on whether display panel 1210 is operating at a first refresh rate (e.g., 60 Hz) or at a second refresh rate (e.g., 90 Hz). FIG. 13B is a graph 1310 illustrating a 90 Hz gamma curve for DBV band 6, in accordance with example embodiments. For instance, display panel 1210 may utilize the gamma curves shown in graph 1300 when it is operating at 60 Hz. On the other hand, display panel 1210 may utilize the gamma curve shown in graph 1310 of FIG. 13B when it is operating at 90 Hz. For the purpose of clarity, graph 1310 only includes the gamma curve for DBV band 6. However, it should be noted that graph 1310 could contain other gamma curves for other DBV bands as well.

The gamma curves for 60 Hz may differ from the gamma curves for 90 Hz. For example, the gamma curve for DBV band 6 in graph 1300 differs from the gamma curve for DBV band 6 in graph 1310. More specifically, the gamma curve for DBV band 6 in graph 1310 has, on average, higher luminance values for input gray levels than the gamma curve for DBV band 6 in graph 1300. In line with the discussion above, this difference may cause a visual flicker to manifest on display panel 1210 when display panel 1210 transitions between 60 Hz to 90 Hz (and vice versa). Consequently, if the display panel 1210 frequently switches between 60 Hz and 90 Hz refresh rates, the visual flicker may become highly pronounced and detrimental to a user's experience. Further, because human eyes are highly sensitive at low luminance settings, the visual flicker is especially noticeable when the luminance of display panel 1210 is low.

Returning back to FIG. 12, ambient light sensor(s) 1230 may be configured to receive light from an environment of (e.g., within 1 meter (m), 5 m, or 10 m of) computing device 1200. Ambient light sensor(s) 1230 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 1230 may include indium gallium arsenide (InGaAs) APDs configured to detect light at wavelengths around 1550 nanometers (nm). Other types of ambient light sensor(s) 1230 are possible and contemplated herein.

In some embodiments, ambient light sensor(s) 1230 may include a plurality of photodetector elements disposed in a one-dimensional array or a two-dimensional array. For example, ambient light sensor(s) 1230 may include sixteen detector elements arranged in a single column (e.g., a linear array). The detector elements could be arranged along, or could be at least parallel to, a primary axis. As described herein, ambient light sensor(s) 1230 may detect ambient light levels, such as, for example, low ambient light (e.g., no light), strong ambient light (e.g., sunlight), and so forth.

In some embodiments, computing device 1200 can include one or more other sensors 1240. Other sensor(s) 1240 can be configured to measure conditions within computing device 1200 and/or conditions in an environment of (e.g., within 1 m, 5 m, or 10 m of) computing device 1200 and provide data about these conditions. For example, other sensor(s) 1240 can include one or more of: (i) sensors for obtaining data about computing device 1200, such as, but not limited to, a thermometer for measuring a temperature of computing device 1200, a battery sensor for measuring power of one or more batteries of computing device 1200, and/or other sensors measuring conditions of computing device 1200; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 1200, such as, but not limited to, a tilt sensor, a gyroscope, an accelerometer, a Doppler sensor, a Global Positioning System (GPS) device, a sonar sensor, a radar device, a laser-displacement sensor, and/or a compass; (iv) an environmental sensor to obtain data indicative of an environment of computing device 1200, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; and/or (v) a force sensor to measure one or more forces (e.g., inertial forces and/or G-forces) acting about computing device 1200, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 1240 are possible as well.

Data gathered from ambient light sensors(s) 1230 and other sensor(s) 1240 may be communicated to controller 1260, which may use the data to perform one or more actions.

Network interface 1250 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 1250 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 1260 may include one or more processors 1262 and memory 1264. Processor(s) 1262 can include one or more general purpose processors and/or one or more special purpose processors (e.g., display driver integrated circuit (DDIC), digital signal processors (DSPs), tensor processing units (TPUs), graphics processing units (GPUs), application specific integrated circuits (ASICs), etc.). Processor(s) 1262 may be configured to execute computer-readable instructions that are contained in memory 1264 and/or other instructions as described herein.

Memory 1264 may include one or more non-transitory computer-readable storage media that can be read and/or accessed by processor(s) 1262. The one or more non-transitory computer-readable storage media can include volatile and/or non-volatile storage components, such as optical, magnetic, organic or other memory or disc storage, which can be integrated in whole or in part with at least one of processor(s) 1262. In some examples, memory 1264 can be implemented using a single physical device (e.g., one optical, magnetic, organic or other memory or disc storage unit), while in other examples, memory 1264 can be implemented using two or more physical devices.

In example embodiments, processor(s) 1262 are configured to execute instructions stored in memory 1264 so as to carry out operations.

The operations may include identifying an input gray level while display panel 1210 is operating at a first refresh rate, wherein display panel 1210 may be configured to operate at multiple refresh rates.

The operations may further include retrieving, from a storage (e.g., memory 1264) at the computing device 1200, a modified gamma value for the input gray level at a second refresh rate. The modified gamma value may have been determined based on measured first and second values for an optical property of display panel 1210 for the input gray level at the first refresh rate, a determined compensation factor for the input gray level at the first refresh rate. This may involve measurements by an image capturing device configured to measure the optical property (e.g., a spectroradiometer or a colorimeter) that is different from computing device 1200. In some embodiments, one or more optical properties can be measured.

The operations may also include adjusting input display data using the modified gamma value for the input gray level.

The operations may also include transitioning, based on the adjusted input display data, display panel 1210 from the first refresh rate to the second refresh rate. For example, controller 1260 may transition display panel 1210 from a 60 Hz refresh rate to a 90 Hz refresh rate, or vice versa. As described herein, the modified gamma value reduces a perceived optical defect of display panel 1210 when operating at the second refresh rate by maintaining a consistent delta difference in values for the optical property between the first and second refresh rates at different ambient brightness levels (e.g., under no ambient light, and under sunlight)

The operations may further include identifying a rate change triggering event while display panel 1210 is operating at the first refresh rate. The transitioning of display panel 1210 from the first refresh rate to the second refresh rate may be performed in response to the identifying of the rate change triggering event. In some embodiments, the rate change triggering event may be initiated by a process running on the device (e.g., brightness settings for different applications, specified times of day, and so forth). In some embodiments, the rate change triggering event may include a user interaction with display panel 1210 (e.g., a fingerprint detection event where the device attempts to authenticate a fingerprint of a user of the computing device 1200). In some embodiments, the rate change triggering event may be based on an environmental state measurement (e.g., by ambient light sensor(s) 1230, and/or other sensor(s) 1240) associated with an environment around the computing device 1200.

The operations may further include, after transitioning display panel 1210 from the first refresh rate to the second refresh rate, detecting that the rate change triggering event has ended. Then, the operations may include, in response to detecting that the rate change triggering event has ended, transitioning display panel 1210 from the second refresh rate to the first refresh rate.

V. Example Methods

Figure 14:
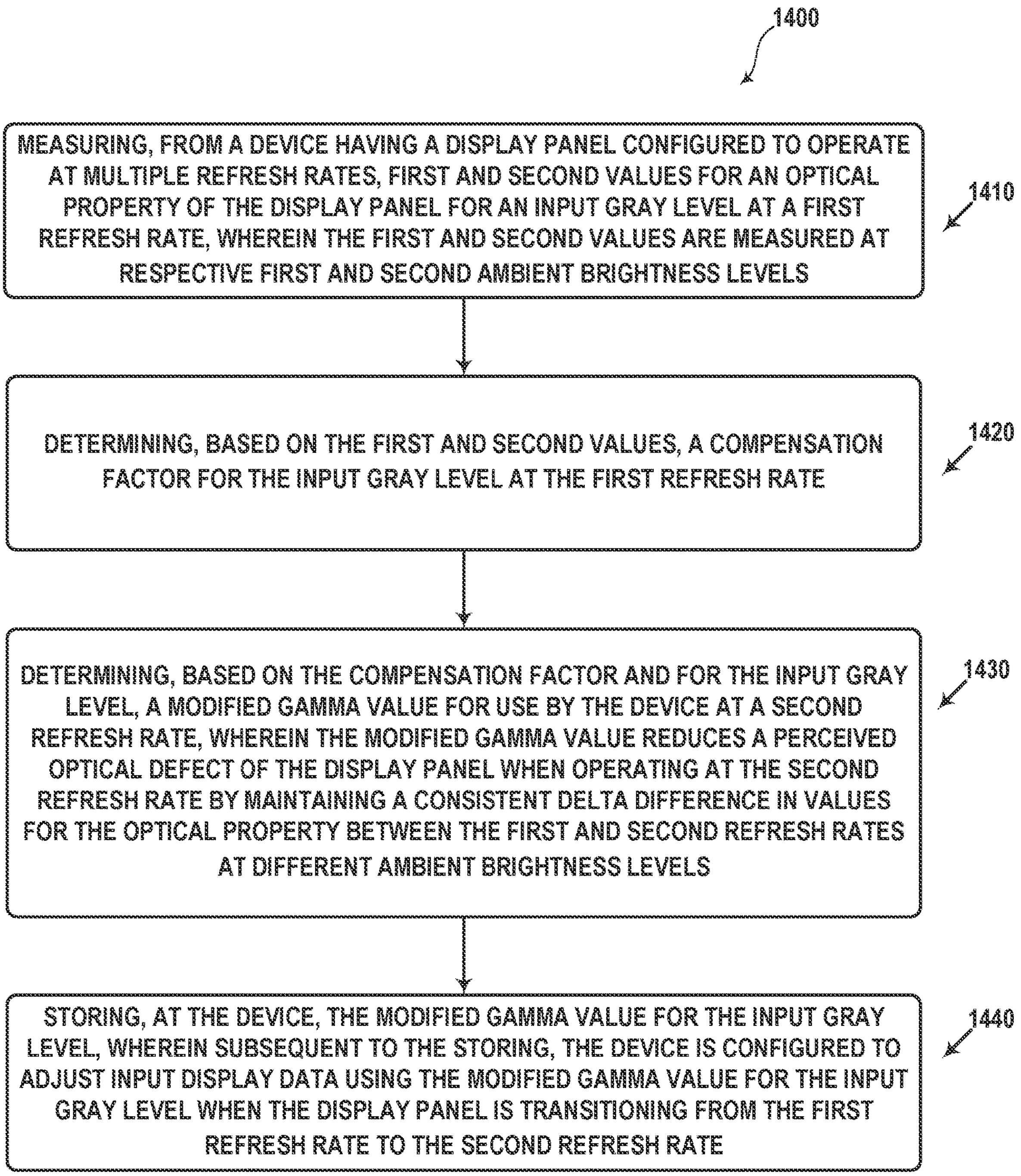
FIG. 14 illustrates a method, in accordance with example embodiments.

FIG. 14 illustrates a method 1400, in accordance with example embodiments. Method 1400 may include various blocks or steps. The blocks or steps may be carried out individually or in combination. The blocks or steps may be carried out in any order and/or in series or in parallel. Further, blocks or steps may be omitted or added to method 1400.

Some or all of the blocks of method 1400 may be carried out by various elements of computing device 1200. Alternatively and/or additionally, some or all of the blocks of method 1400 may be carried out by a computing device that is communicatively coupled to computing device 1200. Furthermore, some implementations of method 1400 may utilize the relationships depicted in graphs and/or tables that are illustrated and described with regard to FIGS. 1 to 13.

Block 1410 includes measuring, from a device having a display panel configured to operate at multiple refresh rates, first and second values for an optical property of the display panel for an input gray level at a first refresh rate, wherein the first and second values are measured at respective first and second ambient brightness levels.

Block 1420 includes determining, based on the first and second values, a compensation factor for the input gray level at the first refresh rate.

Block 1430 includes determining, based on the compensation factor and for the input gray level, a modified gamma value for use by the device at a second refresh rate, wherein the modified gamma value reduces a perceived optical defect of the display panel when operating at the second refresh rate by maintaining a consistent delta difference in values for the optical property between the first and second refresh rates at different ambient brightness levels.

Block 1440 includes storing, at the device, the modified gamma value for the input gray level, wherein subsequent to the storing, the device is configured to adjust input display data using the modified gamma value for the input gray level when the display panel is transitioning from the first refresh rate to the second refresh rate.

In some embodiments, the measuring of the first and second values, the determining of the compensation factor, and the determining of the modified gamma value, is performed for a given display brightness mode for the display panel.

In some embodiments, the measuring of the first and second values, the determining of the compensation factor, and the determining of the modified gamma value, is performed for a given display brightness band for the display panel.

In some embodiments, the display panel has a plurality of color channels. The default gamma value includes respective register values for the plurality of color channels, and the determining of the modified gamma value includes modifying at least one of the register values of the default gamma value. In some embodiments, the plurality of color channels may include red, green and blue (RGB) color channels.

Some embodiments involve determining, for a given display brightness value and a given brightness mode and based on the compensation factor, a target value for the optical property at the second ambient brightness level and at the second refresh rate. Such embodiments may also involve determining, for the given display brightness value and the given brightness mode at the second ambient brightness level and at the second refresh rate, a ratio of the target value for the optical property to a default value for the optical property. Such embodiments may further involve multiplying the default gamma value with the ratio as determined.

Some embodiments involve measuring, from the device, a third value of the optical property of the display panel for the input gray level at the first ambient brightness level and at the second refresh rate. In such embodiments, the determining of the modified gamma value includes multiplying the compensation factor with the third value to determine a target value for the optical property of the display panel for the input gray level at the second ambient brightness level and at the second refresh rate.

In some embodiments, the compensation factor is a ratio of the second value to the first value.

In some embodiments, the measuring is performed by an image capturing device configured to measure the optical property.

In some embodiments, the first refresh rate is 60 Hz and the second refresh rate is 90 Hz.

In some embodiments, the optical property is one of a luminance or a color of the display panel.

In some embodiments, the storing includes storing, in a boot image of the device and for a plurality of input gray levels, a plurality of respective modified gamma values.

Some embodiments involve determining, based on the compensation factor and for the input gray level, a modification of a second default gamma value used by the device at a third refresh rate. In such embodiments, use of the modified second gamma value by the device causes a reduction in a perceived optical defect of the display panel when operating at the third refresh rate by maintaining a consistent delta difference in values for the optical property between the first and third refresh rates at different ambient brightness levels. Such embodiments may also involve storing, at the device, the modified second gamma value for the input gray level, wherein subsequent to the storing, the device is configured to adjust second input display data using the modified second gamma value for the second input gray level when the display panel is transitioning from the first refresh rate to the third refresh rate.

In some embodiments, the perceived optical defect is caused by a thin film transistor (TFT) leakage.

Figure 15:
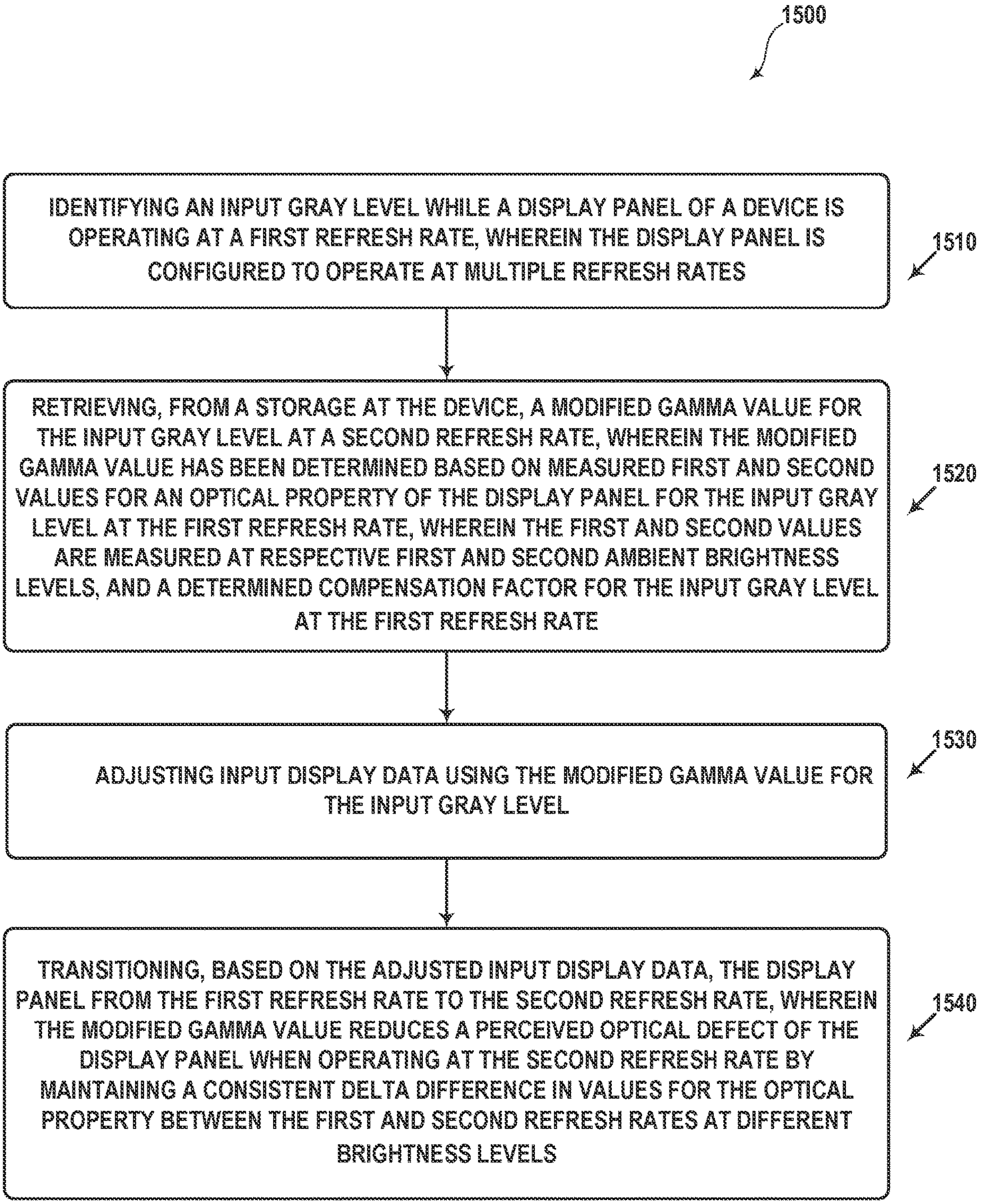
FIG. 15 illustrates another method, in accordance with example embodiments.

FIG. 15 illustrates a method 1500, in accordance with example embodiments. Method 1500 may include various blocks or steps. The blocks or steps may be carried out individually or in combination. The blocks or steps may be carried out in any order and/or in series or in parallel. Further, blocks or steps may be omitted or added to method 1500.

Some or all of the blocks of method 1500 may be carried out by various elements of computing device 1200. Alternatively and/or additionally, some or all of the blocks of method 1500 may be carried out by a computing device that is communicatively coupled to computing device 1200. Furthermore, some implementations of method 1500 may utilize the relationships depicted in graphs and/or tables that are illustrated and described with regard to FIGS. 1 to 13.

Block 1510 includes identifying an input gray level while a display panel of a device is operating at a first refresh rate, wherein the display panel is configured to operate at multiple refresh rates.

Block 1520 includes retrieving, from a storage at the device, a modified gamma value for the input gray level at a second refresh rate, and wherein the modified gamma value has been determined based on measured first and second values for an optical property of the display panel for the input gray level at the first refresh rate, wherein the first and second values are measured at respective first and second ambient brightness levels, and a determined compensation factor for the input gray level at the first refresh rate.

Block 1530 includes adjusting input display data using the modified gamma value for the input gray level.

Block 1540 includes transitioning, based on the adjusted input display data, the display panel from the first refresh rate to the second refresh rate, wherein the modified gamma value reduces a perceived optical defect of the display panel when operating at the second refresh rate by maintaining a consistent delta difference in values for the optical property between the first and second refresh rates at different ambient brightness levels.

Some embodiments involve identifying a rate change triggering event while the display panel is operating at the first refresh rate. The transitioning of the display panel from the first refresh rate to the second refresh rate may be performed in response to the identifying of the rate change triggering event.

In some embodiments, the rate change triggering event may be initiated by a process running on the device.

In some embodiments, the rate change triggering event may include a user interaction with the display panel.

In some embodiments, the rate change triggering event may be based on an environmental state measurement associated with an environment around the device.

Some embodiments involve, after transitioning the display panel from the first refresh rate to the second refresh rate, detecting that the rate change triggering event has ended. Such embodiments may also involve, in response to detecting that the rate change triggering event has ended, transitioning the display panel from the second refresh rate to the first refresh rate.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:

measuring, from a device having a display panel configured to operate at multiple refresh rates, first and second values for an optical property of the display panel for an input gray level at a first refresh rate, wherein the first and second values are measured at respective first and second ambient brightness levels;

determining, based on the first and second values, a compensation factor for the optical property for the input gray level at the first refresh rate as a ratio of the optical property for the input gray level at the second ambient brightness level to the optical property for the input gray level at the first ambient brightness level;

determining, based on the compensation factor and for the input gray level, a modified gamma value for use by the device at a second refresh rate and at the second ambient brightness level, wherein the modified gamma value reduces a perceived optical defect of the display panel when operating at the second refresh rate and at the second ambient brightness level by maintaining a consistent delta difference in values for the optical property between the first and second refresh rates at the first ambient brightness level and in values for the optical property between the first and second refresh rates at the second ambient brightness level; and storing, at the device, the modified gamma value for the input gray level, wherein subsequent to the storing, the device is configured to adjust input display data using the modified gamma value for the input gray level when the display panel is transitioning from the first refresh rate to the second refresh rate at the second ambient brightness level.

2. The method of claim 1, wherein the measuring of the first and second values, the determining of the compensation factor, and the determining of the modified gamma value, is performed for a given display brightness mode for the display panel.

3. The method of claim 1, wherein the measuring of the first and second values, the determining of the compensation factor, and the determining of the modified gamma value, is performed for a given display brightness band for the display panel.

4. The method of claim 1, wherein the display panel has a plurality of color channels, wherein the default gamma value comprises respective register values for the plurality of color channels, and wherein the determining of the modified gamma value comprises modifying at least one of the register values of the default gamma value.

5. The method of claim 4, wherein the plurality of color channels comprise red, green and blue (RGB) color channels.

6. The method of claim 1, wherein the determining of the modified gamma value further comprises:

determining, for a given display brightness value and a given brightness mode and based on the compensation factor, a target value for the optical property at the second ambient brightness level and at the second refresh rate;

determining, for the given display brightness value and the given brightness mode at the second ambient brightness level and at the second refresh rate, a ratio of the target value for the optical property to a default value for the optical property; and multiplying the default gamma value with the ratio as determined.

7. The method of claim 1, further comprising:

measuring, from the device, a third value of the optical property of the display panel for the input gray level at the first ambient brightness level and at the second refresh rate, and wherein the determining of the modified gamma value comprises multiplying the compensation factor with the third value to determine a target value for the optical property of the display panel for the input gray level at the second ambient brightness level and at the second refresh rate.

8. The method of claim 1, wherein the compensation factor is a ratio of the second value to the first value.

9. The method of claim 1, wherein the measuring is performed by an image capturing device configured to measure the optical property.

10. The method of claim 1, wherein the first refresh rate is 60 Hz and wherein the second refresh rate is 90 Hz.

11. The method of claim 1, wherein the optical property is one of a luminance or a color of the display panel.

12. The method of claim 1, wherein the storing comprises storing, in a boot image of the device and for a plurality of input gray levels, a plurality of respective modified gamma values.

13. The method of claim 1, further comprising:

determining, based on the compensation factor and for the input gray level, a modification of a second default gamma value used by the device at a third refresh rate, wherein use of the modified second gamma value by the device causes a reduction in a perceived optical defect of the display panel when operating at the third refresh rate by maintaining a consistent delta difference in values for the optical property between the first and third refresh rates at different ambient brightness levels; and storing, at the device, the modified second gamma value for the input gray level, wherein subsequent to the storing, the device is configured to adjust second input display data using the modified second gamma value for the second input gray level when the display panel is transitioning from the first refresh rate to the third refresh rate.

14. The method of claim 1, wherein the perceived optical defect is caused by a thin film transistor (TFT) leakage.

15. A computer-implemented method comprising:

identifying an input gray level while a display panel of a device is operating at a first refresh rate, wherein the display panel is configured to operate at multiple refresh rates;

retrieving, from a storage at the device, a modified gamma value for the input gray level at a second refresh rate, and wherein the modified gamma value has been determined based on:

measured first and second values for an optical property of the display panel for the input gray level at the first refresh rate, wherein the first and second values are measured at respective first and second ambient brightness levels, and a determined compensation factor for the optical property for the input gray level at the first refresh rate, the compensation factor having been determined as a ratio of the optical property for the input gray level at a second refresh rate and at the second ambient brightness level to the optical property for the input gray level at the first ambient brightness level;

adjusting input display data using the modified gamma value for the input gray level; and transitioning, based on the adjusted input display data, the display panel from the first refresh rate to the second refresh rate, wherein the modified gamma value reduces a perceived optical defect of the display panel when operating at the second refresh rate and at the second ambient brightness level by maintaining a consistent delta difference in values for the optical property between the first and second refresh rates at the first ambient brightness level and in values for the optical property between the first and second refresh rates at the second ambient brightness level.

16. The method of claim 15, further comprising:

identifying a rate change triggering event while the display panel is operating at the first refresh rate, and wherein the transitioning of the display panel from the first refresh rate to the second refresh rate is performed in response to the identifying of the rate change triggering event.

17. The method of claim 16, wherein the rate change triggering event is initiated by a process running on the device.

18. The method of claim 16, wherein the rate change triggering event comprises a user interaction with the display panel.

19. The method of claim 16, wherein the rate change triggering event is based on an environmental state measurement associated with an environment around the device.

20. The method of claim 16, further comprising:

after transitioning the display panel from the first refresh rate to the second refresh rate, detecting that the rate change triggering event has ended; and in response to detecting that the rate change triggering event has ended, transitioning the display panel from the second refresh rate to the first refresh rate.

21. A system comprising:

one or more processors; and non-transitory data storage, wherein the data storage has stored thereon computer-executable instructions that, when executed by the one or more processors, cause the system to carry out operations comprising:

measuring, from a device having a display panel configured to operate at multiple refresh rates, first and second values for an optical property of the display panel for an input gray level at a first refresh rate, wherein the first and second values are measured at respective first and second ambient brightness levels;

determining, based on the first and second values, a compensation factor for the optical property for the input gray level at the first refresh rate as a ratio of the optical property for the input gray level at the second ambient brightness level to the optical property for the input gray level at the first ambient brightness level;

determining, based on the compensation factor and for the input gray level, a modified gamma value for use by the device at a second refresh rate and at the second ambient brightness level, wherein the modified gamma value reduces a perceived optical defect of the display panel when operating at the second refresh rate and at the second ambient brightness level by maintaining a consistent delta difference in values for the optical property between the first and second refresh rates at the first ambient brightness level and in values for the optical property between the first and second refresh rates at the second ambient brightness level; and storing, at the device, the modified gamma value for the input gray level, wherein subsequent to the storing, the device is configured to adjust input display data using the modified gamma value for the input gray level when the display panel is transitioning from the first refresh rate to the second refresh rate at the second ambient brightness level.

22. The method of claim 1, wherein the perceived optical defect comprises a flicker.

* * * * *